US012697988B2

(12) United States Patent
    Komoriya

(10) Patent No.: US 12,697,988 B2
(45) Date of Patent: Aug. 4, 2026

(54) ELECTRONIC CONTROL DEVICE

(71) Applicant: HITACHI ASTEMO, LTD.,
    Hitachinaka (JP)

(72) Inventor: Yuichi Komoriya, Hitachinaka (JP)

(73) Assignee: HITACHI ASTEMO, LTD.,
    Hitachinaka (JP)

( * ) Notice: Subject to any disclaimer, the term of this
    patent is extended or adjusted under 35
    U.S.C. 154(b) by 139 days.

(21) Appl. No.: 18/719,358

(22) PCT Filed: Aug. 25, 2022

(86) PCT No.: PCT/JP2022/032080
    § 371 (c)(1),
    (2) Date: Jun. 13, 2024

(87) PCT Pub. No.: WO2023/132099
    PCT Pub. Date: Jul. 13, 2023

(65) Prior Publication Data
    US 2025/0136128 A1      May 1, 2025

(30) Foreign Application Priority Data
    Jan. 5, 2022      (JP) ................................. 2022-000763

(51) Int. Cl.
    *B60W 50/06*          (2006.01)
(52) U.S. Cl.
    CPC ....... *B60W 50/06* (2013.01); *B60W 2050/065*
    (2013.01)
(58) Field of Classification Search
    CPC ........................ B60W 50/06; B60W 2050/065
    See application file for complete search history.

(56) References Cited

U.S. PATENT DOCUMENTS 8,964,033 B2 * 2/2015 Chidanand ........... G06V 40/103
                                                   348/148
11,226,626 B1 * 1/2022 Silver ................... B60W 30/00
                        (Continued)

FOREIGN PATENT DOCUMENTS

JP          2011-150633 A      8/2011
JP          2018-036796 A      3/2018
                  (Continued)

OTHER PUBLICATIONS

International Search Report with English Translation and Written
Opinion of International Patent Application No. PCT/JP2022/
032080 dated Oct. 18, 2022 (10 pages).
                  (Continued)

*Primary Examiner* — Naeem Taslim Alam
(74) *Attorney, Agent, or Firm* — Foley & Lardner LLP

(57)          ABSTRACT

An electronic control device includes a storage device that
stores target information of a target detected by a plurality
of external sensors installed in an own vehicle, and a control
device that processes the target information stored in the
storage device. The control device acquires information on
an environment of a road on which the own vehicle travels
and a position of the own vehicle, sets an exclusion area,
which is a region for determining the target information to
be excluded from a processing object from among the target
information stored in the storage device, among surrounding
regions of the own vehicle based on the environment of the
road on which the own vehicle travels and the position of the
own vehicle, and determines whether to set the target
information as a processing object or exclude the target
information from the processing object based on the exclu-
sion area and the target information.

11 Claims, 14 Drawing Sheets

(56)      References Cited

U.S. PATENT DOCUMENTS

| | | | | |
|---|---|---|---|---|
| 2017/0177933 | A1* | 6/2017 | Mittal | G06F 18/22 |
| 2017/0371339 | A1* | 12/2017 | Charette | B60W 10/20 |
| 2018/0090008 | A1* | 3/2018 | Ikenouchi | G08G 1/166 |
| 2018/0114078 | A1* | 4/2018 | Tokita | G06V 20/58 |
| 2020/0286387 | A1* | 9/2020 | Zhou | G08G 1/0175 |
| 2020/0320875 | A1* | 10/2020 | Lacaze | G05D 1/0246 |
| 2021/0163013 | A1* | 6/2021 | Ueno | B60W 60/0017 |
| 2021/0197819 | A1* | 7/2021 | Okamoto | B60W 30/06 |
| 2021/0365696 | A1* | 11/2021 | He | G06T 7/12 |
| 2022/0289178 | A1* | 9/2022 | Hagiwara | B60W 30/0953 |
| 2022/0309796 | A1* | 9/2022 | Yasui | G06V 20/59 |
| 2022/0319327 | A1* | 10/2022 | Nakamura | G08G 1/096791 |
| 2022/0340142 | A1* | 10/2022 | Shimizu | B60W 50/0097 |
| 2023/0322250 | A1* | 10/2023 | Unno | G08G 1/167 |
| | | | | 340/425.5 |
| 2024/0127725 | A1* | 4/2024 | Fukuda | B60Q 1/50 |
| 2024/0174203 | A1* | 5/2024 | Wang | B60W 30/18154 |

FOREIGN PATENT DOCUMENTS

| | | | |
|---|---|---|---|
| JP | 2018-055426 A | 4/2018 | |
| JP | 2019-055622 A | 4/2019 | |

OTHER PUBLICATIONS

International Preliminary Report on Patentability issued in corresponding International Application No. PCT/JP2022/032080, dated Jul. 18, 2024 (7 pages).

\* cited by examiner

|  | x COORDINATE [m] | y COORDINATE [m] |
|---|---|---|
| POSITION OF OWN VEHICLE | 0. 0 | 0. 0 |
| POSITION a1 | 20. 0 | 25. 0 |
| POSITION a2 | 27. 0 | 25. 0 |
| POSITION a3 | 20. 0 | —40. 0 |
| POSITION a4 | 27. 0 | —40. 0 |

START

RECOGNIZE MEDIAN STRIP — S020

RECOGNIZE OPPOSITE LANE — S021

SET EXCLUSION AREA
ON OPPOSITE LANE — S022

END

```
                    START

NO  ◇ IS OWN VEHICLE         S001
    IN STOPPED STATE?

YES

RECOGNIZE CROSSWALK   S030    RECOGNIZE WALKWAY   S033

SET EXCLUSION AREA    S031    SET EXCLUSION AREA   S034
ON CROSSWALK                 ON WALKWAY

END
```

ELECTRONIC CONTROL DEVICE

TECHNICAL FIELD

The present invention relates to an electronic control device.

BACKGROUND ART

In a vehicle including a driving assistance system and a self-driving system, an external sensor that detects a target such as an automobile, a two-wheeled vehicle, or a pedestrian existing around an own vehicle is installed. Examples of the external sensor that detects a target include a camera, a stereo camera, a radar, and a laser radar. These external sensors have different performances such as the number of sensors to be installed, a detection range, and the number of detectable targets depending on an operational design domain (ODD), which is a condition under which functions of the driving assistance system, the self-driving system, and the like are operated, and various combinations are assumed.

For example, the driving assistance system, which assists driving of a vehicle based on the behavior of a target in front of the vehicle, such as adaptive cruise control (ACC) and autonomous emergency braking (AEB), includes a front camera for detecting the target in front of the vehicle, and a corner radar for detecting the target in left/right front of the vehicle. The self-driving system, which causes a vehicle to automatically travel from a current place to a destination, needs to detect targets existing in the rear of the vehicle and around the vehicle other than in front of the vehicle. Therefore, the self-driving system includes, for example, a corner radar for detecting the target in the left/right rear of the vehicle, a camera for detecting targets in all directions around the vehicle, and a laser radar.

However, the more the number of external sensors and the number of targets to be detected by the external sensors increase, the greater the load of processing using target information of the detected targets becomes. For example, in a target integration system that integrates target information of targets detected by a plurality of types of external sensors, the more the number of external sensors and the number of targets to be detected by the external sensors increase, the greater the load of integration processing of target information becomes.

PTL 1 discloses a technique for reducing processing load in a target detection system for vehicle including a plurality of sensors for detecting a target. The target detection system for vehicle described in PTL 1 includes a sensor for detecting targets around the vehicle and a sensor control unit which generates target information of each of the targets detected by the sensor and transmits the target information to the central control unit.

The sensor control unit determines which of a plurality of areas into which the peripheral area of the vehicle is divided each target detected by the sensor exists in, calculates a priority of each target based on scores set to these areas. The sensor control unit transmits target information of targets of high priorities to the central control unit but does not transmit target information of targets of low priorities to the central control unit. As described above, in the target detection system for vehicle described in PTL 1, the target information transmitted from the sensor control unit to the central control unit is limited, and thus the processing load on the central control unit is reduced.

CITATION LIST

Patent Literature

PTL 1: JP 2018-055426 A

SUMMARY OF INVENTION

Technical Problem

However, in the technique described in PTL 1, the score is set in advance in each area with reference to the vehicle. For this reason, the technique described in PTL 1 cannot appropriately cope with a change in a road environment accompanying the traveling of the vehicle, and processes unnecessary target information depending on the road environment, which may increase the processing load.

An object of the present invention is to provide an electronic control device that can appropriately reduce a load of processing using target information of a target detected by an external sensor in accordance with an environment of a road on which an own vehicle travels and a position of the own vehicle.

Solution to Problem

An electronic control device according to one aspect of the present invention includes: a storage device that stores target information of a target detected by a plurality of external sensors installed in an own vehicle; and a control device that processes the target information stored in the storage device. The control device acquires information on an environment of a road on which the own vehicle travels and a position of the own vehicle, sets an exclusion area, which is a region for determining the target information to be excluded from a processing object from among the target information stored in the storage device, among surrounding regions of the own vehicle based on the environment of the road on which the own vehicle travels and the position of the own vehicle, and determines whether to set the target information as a processing object or exclude the target information from the processing object based on the exclusion area and the target information.

Advantageous Effects of Invention

According to the present invention, it is possible to provide an electronic control device that can appropriately reduce a load of processing using target information of a target detected by an external sensor in accordance with an environment of a road on which an own vehicle travels and a position of the own vehicle.

DESCRIPTION OF EMBODIMENTS

Hereinafter, an electronic control device according to embodiments of the present invention will be described with reference to the drawings. Note that in all drawings for describing the present embodiment, blocks or elements that have the identical function are denoted by the identical reference signs, and repeated description thereof will be omitted.

First Embodiment

Figure 1:
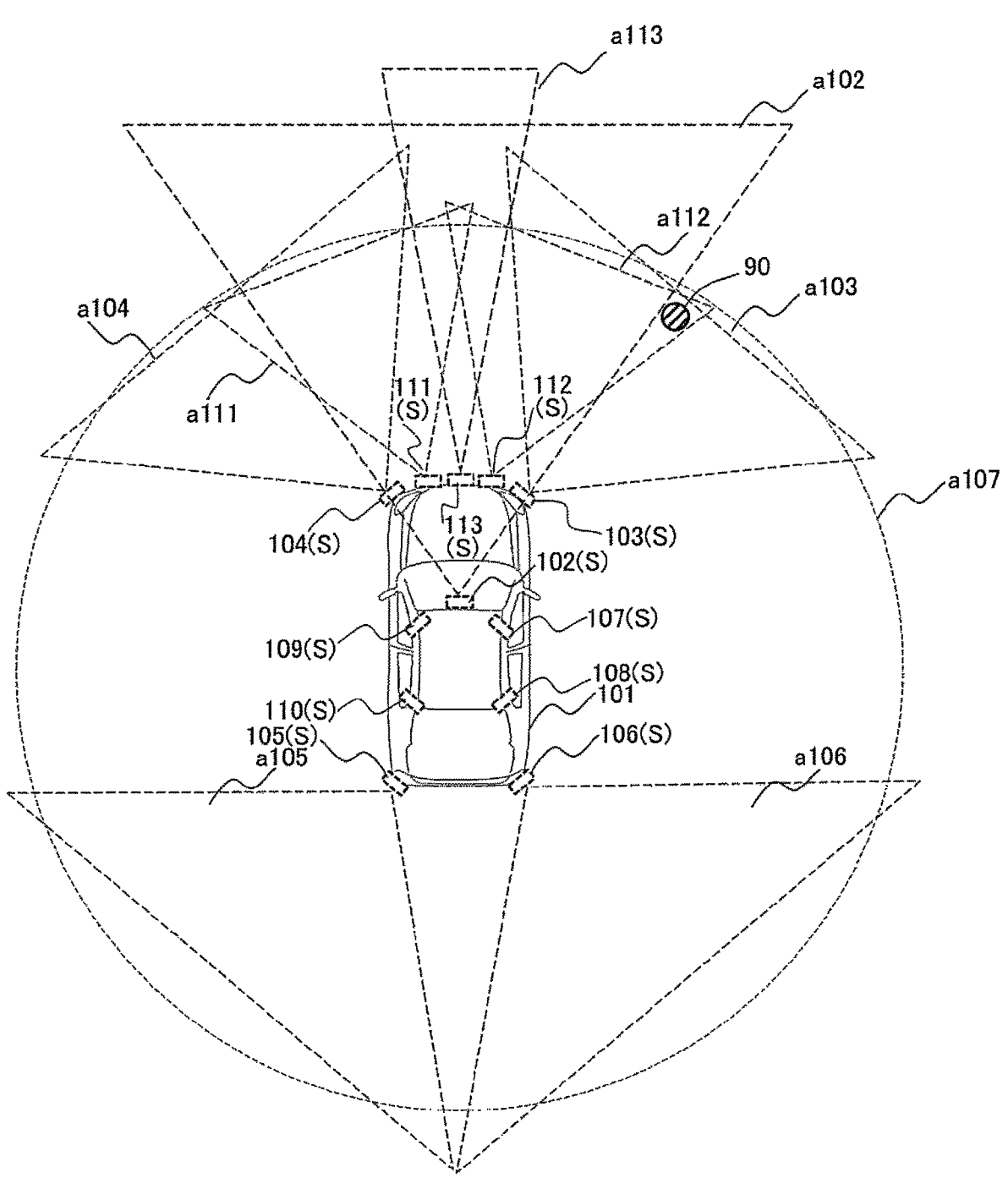
FIG. 1 is a plan view of a vehicle, and illustrates various external sensors installed in the vehicle and detection ranges thereof.

A configuration example of a plurality of external sensors S provided in a vehicle (hereinafter, also written as an own vehicle) mounted with an electronic control device according to the present embodiment will be described with reference to FIG. 1. FIG. 1 is a plan view of the vehicle, and illustrates various external sensors installed in the vehicle and detection ranges thereof. As illustrated in FIG. 1, 12 of the external sensors S, i.e., a front camera 102, medium range radars 103, 104, 105, and 106, peripheral vision cameras 107, 108, 109, and 110, laser radars 111 and 112, and a long range radar 113 are installed in the vehicle 101.

The front camera 102 is provided on a windshield of the vehicle 101, and detects a target in a detection range a102 in front of the vehicle 101. The medium range radar 103 is provided at the right end part of a front bumper of the vehicle 101, and detects a target in a detection range a103 in right front of the vehicle 101. The medium range radar 104 is provided at the left end part of the front bumper of the vehicle 101, and detects a target in a detection range a104 in left front of the vehicle 101. The medium range radar 105 is provided at the left end part of a rear bumper of the vehicle 101, and detects a target in a detection range a105 in the left rear of the vehicle 101. The medium range radar 106 is provided at the right end part of the rear bumper of the vehicle 101, and detects a target in a detection range a106 in the right rear of the vehicle 101. The peripheral vision cameras 107, 108, 109, and 110 are provided on a side surface of the vehicle 101, and detect a target in a detection range a107 of 360° around the vicinity of the vehicle 101.

The long range radar 113 is provided in a center part of a front grille of the vehicle 101, and detects a target in a detection range a113 in front of the vehicle 101. The laser radar 111 is provided on the left of the long range radar 113 on the front bumper, and detects a target in a detection range a111 in left front of the vehicle 101. The laser radar 111 is provided on the right of the long range radar 113 on the front bumper, and detects a target in a detection range a112 in right front of the vehicle 101.

As described above, in the present embodiment, the plurality of external sensors S detect targets existing at 360° around the vehicle 101. The type and number of targets to be detected by each of the external sensors S are different depending on the performance. Target information of a target detected by each of the external sensors S is transmitted to various electronic control units (ECUs) via an in-vehicle bus. Note that hereinafter, the entire range detectable by the plurality of external sensors S is also written as a target detection range.

Figure 2:
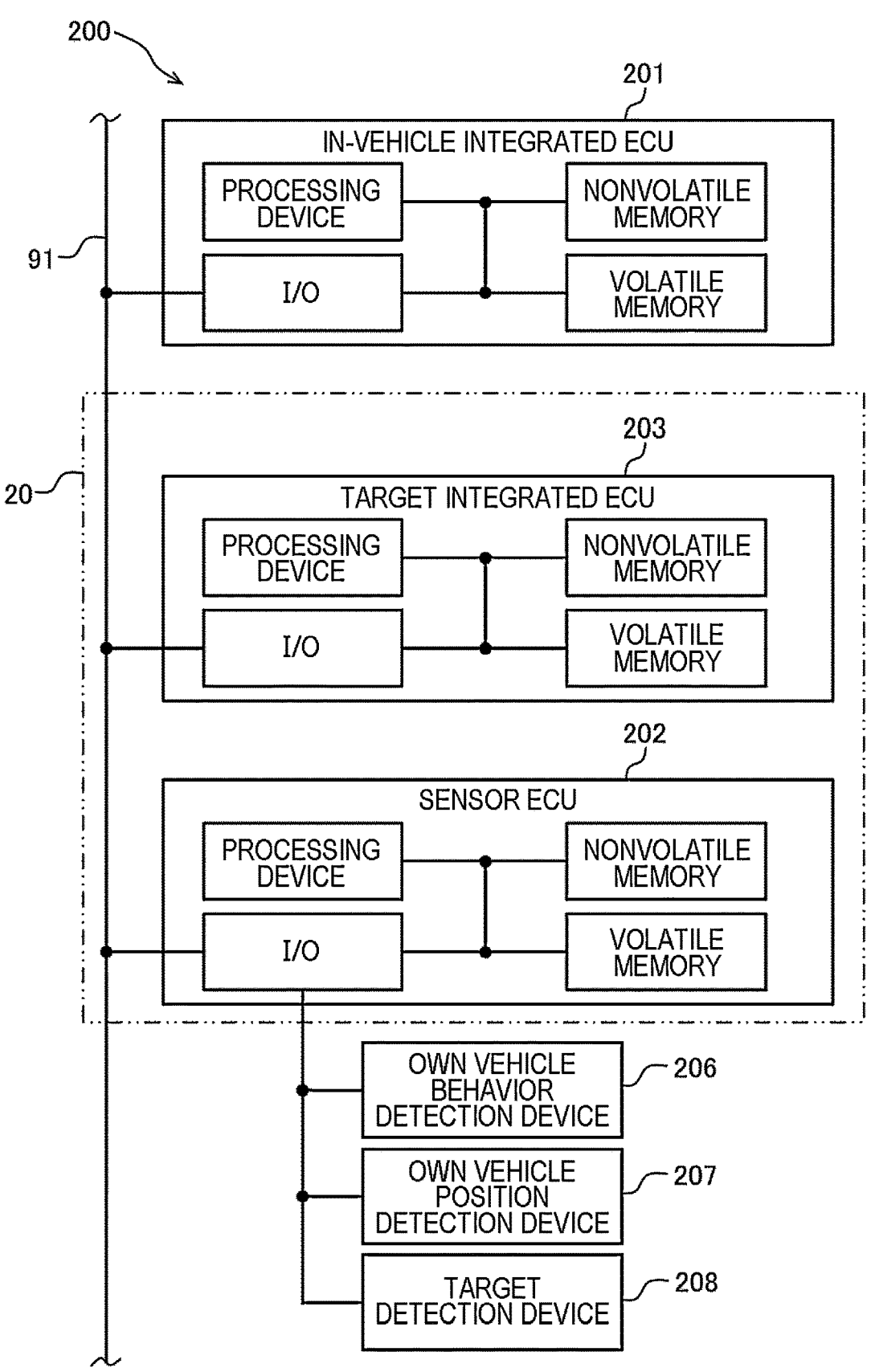
FIG. 2 is a view illustrating an example of a hardware configuration of an electronic control device.

FIG. 2 is a view illustrating an example of a hardware configuration of an electronic control device 200 according to the present embodiment. As illustrated in FIG. 2, the electronic control device 200 includes a plurality of ECUs including an in-vehicle integrated ECU 201, a sensor ECU 202, and a target integrated ECU 203, and an in-vehicle bus 91 that connects among the plurality of ECUS.

Note that the sensor ECU 202 and the target integrated ECU 203 may be one ECU having respective functions. The functions of the sensor ECU 202 and/or the target integrated ECU 203 may be included in the in-vehicle integrated ECU 201. Furthermore, the function of the sensor ECU 202 may be implemented by the plurality of ECUs.

Each ECU includes a computer including a processing device such as a central processing unit (CPU), a micro processing unit (MPU), and a digital signal processor (DSP), a nonvolatile memory such as a read only memory (ROM), a flash memory, and a hard disk drive, a volatile memory called a random access memory (RAM), an input/output interface, and other peripheral circuits. As the processing device, an application specific integrated circuit (ASIC), a field programmable gate array (FPGA), and the like can also be used. The nonvolatile memory and the volatile memory function as storage devices that store information (data).

The nonvolatile memory stores a program that can execute various calculations. That is, the nonvolatile memory is a storage device (storage medium) that can read a program that implements the functions of the present embodiment. The processing device is a calculation device that develops, into a volatile memory, a program stored in the nonvolatile memory and executes a calculation, and, in accordance with the program, performs predetermined calculation processing on signals taken in from the input/output interface, and the nonvolatile memory and the volatile memory that are storage devices.

An input part of the input/output interface converts signals input from various devices such that the signals can be calculated by the processing device. An output part of the input/output interface generates a signal for output in accordance with a calculation result in the processing device, and outputs the signal to various devices.

The in-vehicle integrated ECU 201 integrally controls a plurality of ECUs in order to exhibit a driving assistance function and a self-driving function based on signals output from the plurality of ECUs. The sensor ECU 202 stores, into a storage device of the sensor ECU 202, target information of a target detected by the plurality of external sensors S installed in the own vehicle 101, and outputs, to the target integrated ECU 203, target information that is a processing object from the target information stored in the storage device. The target integrated ECU 203 stores, into a storage device of the target integrated ECU 203, target information output from the sensor ECU 202, and performs processing of integrating the target information stored in the storage device.

When the same target is detected by the plurality of types of external sensors S, the target integrated ECU 203 generates and stores, into the storage device, integrated target information in which target information of the targets detected by the plurality of types of external sensors S are integrated. In the present embodiment, the sensor ECU 202 and the target integrated ECU 203 constitute a control device 20 that performs integration processing of target information of targets detected by the plurality of external sensors S.

The target integrated ECU 203 generates integrated target information including a position of a target based on a plurality of pieces of target information generated for one target. An example of f integration processing of target information in a case where a target 90 existing in right front of the vehicle 101 is detected by the medium range radar 103, the camera 107, and the laser radar 112 as illustrated in FIG. 1 will be described. It is assumed that the position of the target 90 detected by the medium range radar 103 is a position A, the position of the target 90 detected by the camera 107 is a position B, and the position of the target 90 detected by the laser radar 112 is a position C. Assuming that objects having the same mass exist at the position A, the position B, and the position C, the target integrated ECU 203 calculates a barycentric position thereof as integrated target information. Note that the mass of the object assumed at each of the positions A, B, and C may be increased as the reliability of the external sensor S is higher.

The target integrated ECU 203 illustrated in FIG. 2 generates integrated target information at a predetermined control cycle and performs tracking of the target. The integrated target information is output to another ECU not illustrated. The integrated target information is used in the other ECU as input information for performing warning control to the driver at the time of driving assistance, avoidance operation control at the time of self-driving, and the like.

As described above, when a predetermined target is detected by the plurality of types of external sensors S, the control device 20 according to the present embodiment performs integration processing of target information of a predetermined target detected by the plurality of types of external sensors S and performs processing of tracking the target. Therefore, the greater the number of the external sensors S and the number of targets detected by the external sensors S are, the more the number of targets to be processed increases proportionally, and the greater the processing load of the integration processing becomes.

For example, in a case where 10 targets are detected by each of two external sensors S and the target information thereof is processed, it is necessary to process target information for 20 targets. In a case where 20 targets are detected by four external sensors S and the target information thereof is processed, it is necessary to process target information for 80 targets.

Therefore, in the present embodiment, the integration processing is performed not using all pieces of target information of the targets detected by the plurality of types of external sensors S, but the target information that is the processing object of the integration processing is limited from the target information of the targets detected by the plurality of types of external sensors S, and the processing load of the target integration processing is reduced. Hereinafter, a method of determining a processing object of integration processing will be described in detail.

Figure 3:
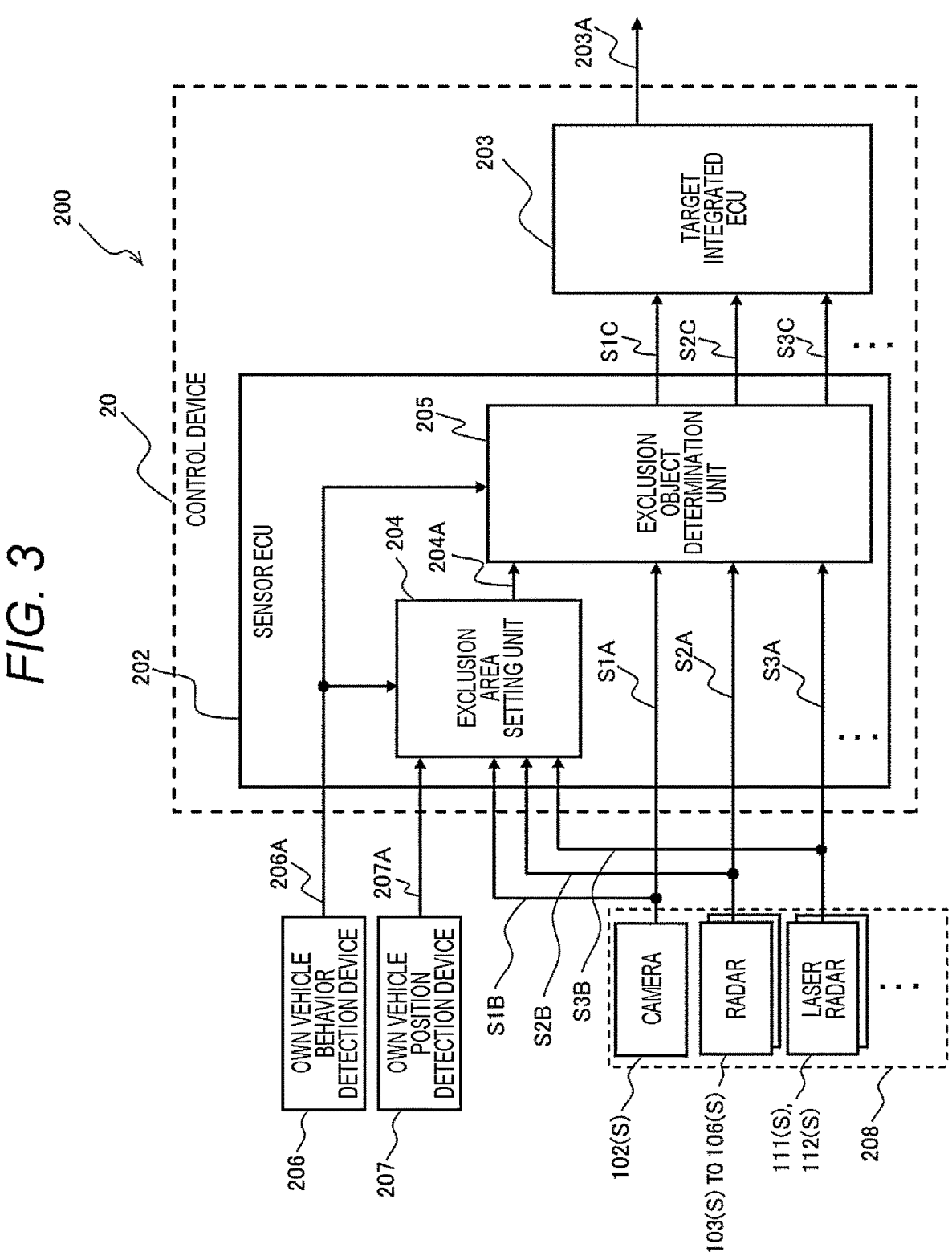
FIG. 3 is a functional block diagram of the electronic control device.

FIG. 3 is a functional block diagram of the electronic control device 200 according to the present embodiment. The sensor ECU 202 is connected with an own vehicle behavior detection device 206 that detects the behavior of the own vehicle 101, an own vehicle position detection device 207 that detects the position of the own vehicle 101, and a target detection device 208 that detects a target existing around the own vehicle 101. The target detection device 208 includes the plurality of external sensors S described above. Note that in order to avoid complication of the drawing, FIG. 3 illustrates only the front camera 102, the medium range radars 103 to 106, and the laser radars 111 and 112 among the plurality of external sensors S, and does not illustrate the peripheral vision cameras 107 to 110 and the long range radar 113, which are the other external sensors S.

The own vehicle behavior detection device 206 includes a gyro sensor, a wheel speed sensor, a steering angle sensor, and an acceleration sensor that are mounted on the vehicle 101. The gyro sensor detects a yaw rate indicating the behavior of the vehicle 101, and outputs information indicating a detection result to the sensor ECU 202. The wheel speed sensor detects a wheel speed of the vehicle 101, and outputs information indicating a detection result to the sensor ECU 202. The steering angle sensor detects a steering angle of the vehicle 101, and outputs information indicating a detection result to the sensor ECU 202. The acceleration sensor detects acceleration of the vehicle 101, and outputs information indicating a detection result to the sensor ECU 202. Hereinafter, information indicating the detection result of the own vehicle behavior detection device 206 is also written as own vehicle behavior information 206A.

The own vehicle position detection device 207 has a map transmission function and a locator function. The map transmission function is a function of transmitting information such as a lane, a road shape, and a traffic rule as map information. Note that the map information may be simple map information for navigation, or may be highly accurate map information having highly accurate information at the lane level.

The locator function is a function of acquiring own vehicle position information by a positioning device including a global navigation satellite system (GNSS) antenna attached to the vehicle 101. The own vehicle position information includes position coordinates of the own vehicle in a global coordinate system that is position information of the own vehicle 101 and an azimuth of the own vehicle 101 that is posture information of the own vehicle 101. The own vehicle position detection device 207 outputs map/position information 207A including map information and own vehicle position information to the sensor ECU 202.

The target detection device 208 outputs, to the sensor ECU 202, target information S1A, S2A, and S3A of detected targets and road environment information S1B, S2B, and S3B of detected lanes, road boundaries, median strips, traffic lights, and the like.

As illustrated in FIG. 3, by executing a program stored in the nonvolatile memory, the sensor ECU 202 functions as an exclusion area setting unit 204 and an exclusion object determination unit 205.

The exclusion area setting unit 204 acquires information on the environment of the road on which the own vehicle 101 travels and the position and speed of the own vehicle 101. The environment of the road on which the own vehicle 101 travels refers to a boundary (shape) of the road on which the own vehicle 101 travels, the number of lanes, the traveling lane on which the own vehicle 101 travels, an intersection existing in a traveling direction of the own vehicle 101, a boundary (shape) of a crossing lane, a traffic light, and the like. The environment of the road on which the own vehicle 101 travels can be specified from the map/position information 207A and the road environment information S1B, S2B, and S3B. The position of the own vehicle 101 can be specified from the map/position information 207A, and the speed of the own vehicle 101 can be specified from the own vehicle behavior information 206A.

The exclusion area setting unit 204 sets an exclusion area, which is a region for determining target information to be excluded from the processing object from the target information stored in the storage device, in the surrounding region (target detection range) of the own vehicle 101 based on the environment of the road on which the own vehicle 101 travels and the position and speed of the own vehicle 101.

The target information of the target in the exclusion area is excluded from the processing object of the target integration processing where a predetermined condition is satisfied as described later. In other words, the target information of the target in the exclusion area is determined as an exclusion object from the target integration processing in a case where the predetermined condition is satisfied.

The function of the exclusion area setting unit 204 will be described more specifically. The exclusion area setting unit 204 specifies the traveling lane on which the own vehicle 101 travels based on the own vehicle behavior information 206A from the own vehicle behavior detection device 206 and the road environment information S1B, S2B, and S3B from the target detection device 208. Note that the exclusion area setting unit 204 may specify the traveling lane on which the own vehicle 101 travels based on the map information and the own vehicle position information included in the map/position information 207A from the own vehicle position detection device 207.

The road environment information S1B, S2B, and S3B output from the target detection device 208 or the map/position information 207A output from the own vehicle position detection device 207 includes, in the target detection range, reference vehicle road environment information including a boundary (shape) of the road on which the own vehicle 101 travels, a shape of an intersection existing in the traveling direction of the own vehicle 101, and information on a distance from the own vehicle 101 to a traffic light, an intersection, and a crosswalk existing in the traveling direction of the own vehicle 101. The exclusion area setting unit 204 sets an exclusion area based on the specified traveling lane on which the own vehicle 101 travels and the vehicle reference road environment information.

Figure 4:
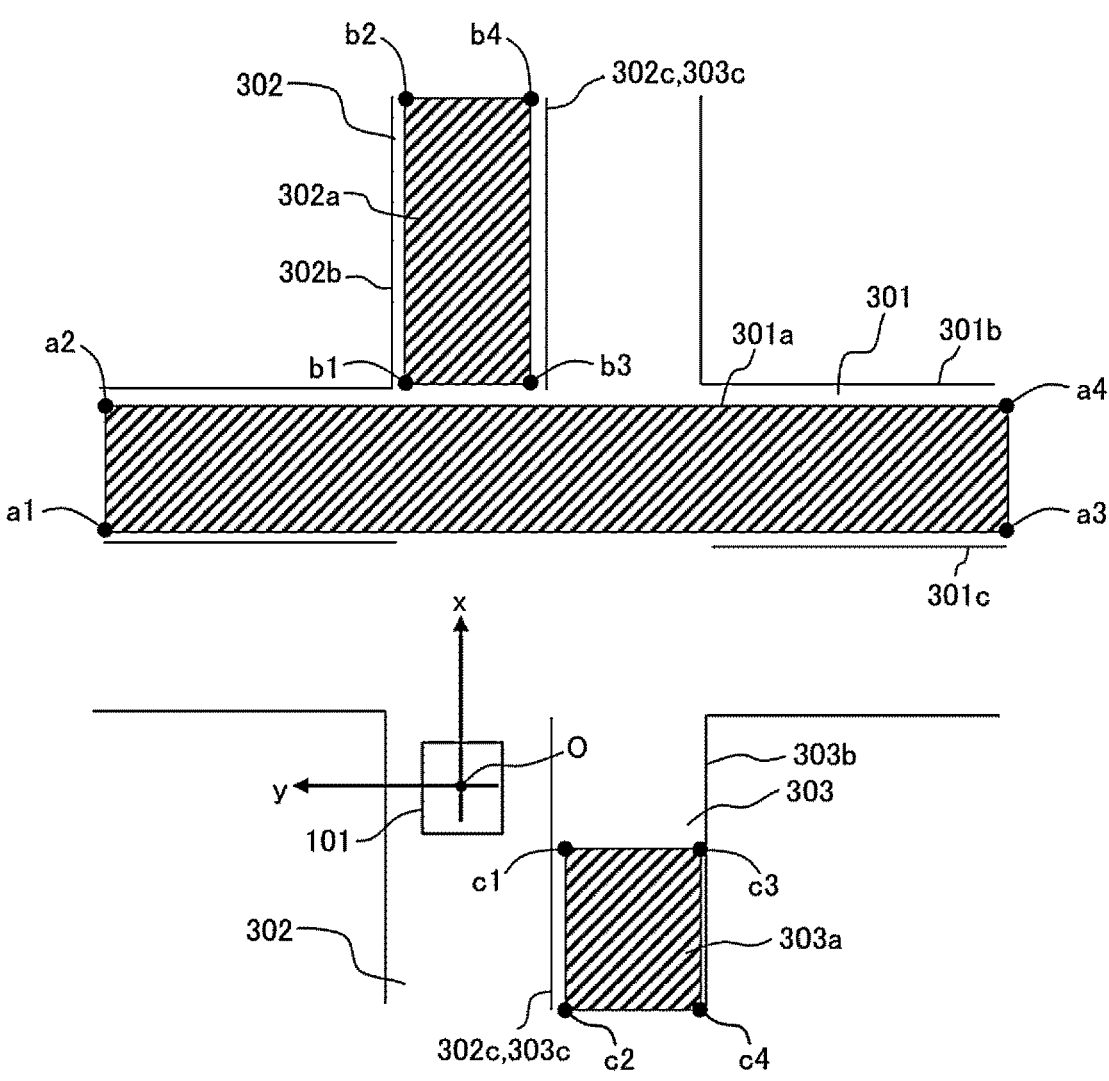
FIG. 4 is a view describing an example of an exclusion area to be set by an exclusion area setting unit according to a first embodiment.

The exclusion area will be described in detail with reference to FIG. 4. FIG. 4 is a view illustrating an example of an exclusion area set by the exclusion area setting unit according to the first embodiment. As illustrated, in the present embodiment, the exclusion area has a rectangular shape.

In the example illustrated in FIG. 4, the road on which the own vehicle 101 travels is a road with one lane on each side, and an intersection exists in front (traveling direction) of the own vehicle 101. The own vehicle 101 is stopped before the intersection.

Note that a lane on which the own vehicle 101 travels is written as an own vehicle traveling lane 302, a lane that crosses the own vehicle traveling lane 302 is written as a crossing lane 301, and a lane on which an oncoming vehicle in a traveling direction opposite to that of the own vehicle 101 travels is written as an opposite lane 303.

In the crossing lane 301, a target (another vehicle) crosses with respect to the traveling direction of the own vehicle 101. In the crossing lane 301, a lane on a near side of the own vehicle 101, the lane where a target (another vehicle) travels from the right side to the left side in the figure, and a lane on a far side of the own vehicle 101, the lane where a target (another vehicle) travels from the left side to the right side in the figure exist.

If a target (another vehicle) traveling in the lane on the near side is excluded from the processing object, the target of the exclusion object and the own vehicle 101 may come into contact with each other when the own vehicle 101 in a stopped state starts to travel. On the other hand, in the crossing lane 301, a target existing in a lane on the far side from the own vehicle 101 is less likely to come into contact with the own vehicle 101 compared with a target existing in a lane on a near side of the own vehicle 101. Therefore, the exclusion area setting unit 204 sets an exclusion area 301a in a lane on the far side from the own vehicle 101 in the crossing lane 301 in the target detection range.

In the own vehicle traveling lane 302, a target existing in a region on the far side of the intersection is less likely to come into contact with the own vehicle 101 compared with a target existing in a region on the near side of the intersection. Therefore, the exclusion area setting unit 204 sets an exclusion area 302a in a region ahead the intersection in the own vehicle traveling lane 302.

In the opposite lane 303, a target existing in a region behind the own vehicle 101 is less likely to come into contact with the own vehicle 101 than a target existing in a region ahead of the own vehicle 101. Therefore, the exclusion area setting unit 204 sets an exclusion area 303a in a region behind the rear bumper of the own vehicle 101 in the opposite lane 303.

The exclusion area setting unit 204 sets the exclusion area 301a by calculating and storing, into the storage device, the positions a1, a2, a3, and a4 of the four corners of the exclusion area 301a. The exclusion area setting unit 204 sets the exclusion area 302a by calculating and storing, into the storage device, positions b1, b2, b3, and b4 of the four corners of the exclusion area 302a. The exclusion area setting unit 204 sets the exclusion area 303a by calculating and storing, into the storage device, positions c1, c2, c3, and c4 of the four corners of the exclusion area 303a.

The positions a1 to a4, b1 to b4, and c1 to c4 for specifying the exclusion areas 301a, 302a, and 303a are defined by a coordinate system (hereinafter, also written as a vehicle reference coordinate system) with reference to the own vehicle 101.

In the vehicle reference coordinate system, for example, the center of the vehicle body is set as an origin O, an axis extending forward along the center line in the left-right width direction of the vehicle body from the origin O is set as an x axis, and an axis orthogonal to the x axis and extending in the left direction of the own vehicle 101 from the origin O is set as a y axis. The x coordinate and the y coordinate of the origin O are 0 (zero).

The x coordinates of the positions a1 to a4 are set based on a boundary line of the crossing lane 301, i.e., a boundary line 301b corresponding to the outline of the crossing lane 301 and a boundary line 301c between the lane in which the left direction is the traveling direction and the lane in which the right direction is the traveling direction in the crossing lane 301. Any coordinates outside the target detection range in the crossing lane 301 are set as the y coordinates of the positions a1 to a4.

The y coordinates of the positions b1 to b4 are set based on boundary lines 302b and 302c of the own vehicle traveling lane 302. Any coordinates outside the target detection range in the own vehicle traveling lane 302 are set as the x coordinates of the positions b2 and b4. The x coordinates of the positions b1 and b3 are set based on the positions and shapes of the own vehicle traveling lane 302 and the intersection.

The y coordinates of the positions c1 to c4 are set based on boundary lines 303b and 303c of the opposite lane 303. Any coordinates outside the target detection range in the opposite lane 303 are set as the x coordinates of the positions c2 and c4. The x coordinates of the positions c1 and c3 are set based on the positions and shapes of the opposite lane 303 and the own vehicle 101.

A target existing in the exclusion areas 301a, 302a, and 303a is less likely to come into contact with the own vehicle 101 compared with a target existing outside the exclusion areas 301a, 302a, and 303a in the target detection range. Therefore, the priority of performing the target integration processing on the target information of the target existing in the exclusion areas 301a, 302a, and 303a is lower than the priority of performing the target integration processing on the target existing outside the exclusion areas 301a, 302a, and 303a.

Therefore, in the present first embodiment, the exclusion object determination unit 205 determines target information to be excluded from the processing object of the target integration processing from among target information of targets existing in the exclusion areas 301a, 302a, and 303a.

As described above, the exclusion area setting unit 204 illustrated in FIG. 3 generates the exclusion area information 204A including the coordinates of the positions a1 to a4, b1 to b4, and c1 to c4 that define the exclusion areas 301a, 302a, and 303a.

Based on the exclusion areas 301a, 302a, and 303a and the target information, the exclusion object determination unit 205 determines whether to set the target information as a processing object or exclude the target information from the processing object. In other words, the exclusion object determination unit 205 selects target information that is the processing object in the target integration processing from among target information of targets detected by the target detection device 208, and outputs only the selected target information to the target integrated ECU 203.

In the present embodiment, the exclusion object determination unit 205 determines the target information S1A, S2A, and S3A to be excluded from the processing object based on the own vehicle behavior information 206A, the target information S1A, S2A, and S3A, and the exclusion area information 204A. Hereinafter, a determination method of a processing object and an exclusion object in the present embodiment will be described in detail.

The exclusion object determination unit 205 determines whether the own vehicle 101 is in a stopped state or in a traveling state based on the own vehicle behavior information 206A. The exclusion object determination unit 205 determines that the own vehicle 101 is in the stopped state when a wheel speed V included in the own vehicle behavior information 206A is equal to or less than a predetermined speed Va (e.g., 0 to several km/h), and determines that the own vehicle 101 is in the traveling state when the wheel speed V is greater than the predetermined speed Va.

The determination method of whether to be in a stopped state or a traveling state is not limited to this. For example, the exclusion object determination unit 205 may determine that the own vehicle 101 is in a stopped state when a traffic light ahead of the own vehicle detected by the target detection device 208 is in a stop indication (red light is on). The exclusion object determination unit 205 may determine that the own vehicle 101 is in a stopped state when a signal indicating that the own vehicle 101 is in a stopped state is acquired from an external device by wireless communication.

The exclusion object determination unit 205 determines whether or not the target exists in the exclusion areas 301a, 302a, and 303a based on the relative positions of the own vehicle 101 and the target included in the target information S1A, S2A, and S3A, and the positions a1 to a4, b1 to b4, and c1 to c4 that define the exclusion areas 301a, 302a, and 303a included in the exclusion area information 204A.

The target information S1A, S2A, and S3A include information on the relative speed between the own vehicle 101 and the target. Based on the relative speed between the own vehicle 101 and the target existing in the exclusion areas 301a, 302a, and 303a, the exclusion object determination unit 205 determines whether the target information S1A, S2A, and S3A of the target is a processing object or excluded from the processing object.

Specifically, the exclusion object determination unit 205 determines whether or not the target existing in the exclusion areas 301a, 302a, and 303a is moving in a direction away from the own vehicle 101 based on the relative speed between the own vehicle 101 and the target existing in the exclusion areas 301a, 302a, and 303a.

Upon determining that the target existing in the exclusion areas 301a, 302a, and 303a is moving in a direction away from the own vehicle 101, the exclusion object determination unit 205 excludes the target information S1A, S2A, and S3A of the target used for the determination from the processing object. That is, the exclusion object determination unit 205 sets, as the exclusion object, the target information S1A, S2A, and S3A of the target used for the determination.

Upon determining that the target existing in the exclusion areas 301a, 302a, and 303a is not moving in a direction away from the own vehicle 101, the exclusion object determination unit 205 does not exclude the target information S1A, S2A, and S3A of the target used for the determination from the processing object. That is, the exclusion object determination unit 205 sets, as the processing object, the target information S1A, S2A, and S3A of the target used for the determination.

The exclusion object determination unit 205 outputs, to the target integrated ECU 203, target information other than the target information determined to be excluded from the processing object, i.e., target information S1C, S2C, and S3C as a processing object. The exclusion object determination unit 205 does not output, to the target integrated ECU 203, target information determined to be excluded from processing objects, i.e., target information as an exclusion object.

The target integrated ECU 203 integrates the target information S1C, S2C, and S3C as the processing object output from exclusion object determination unit 205, and generates and outputs integrated target information 203A. As described above, in the present embodiment, the target information input to the target integrated ECU 203 is limited by the exclusion object determination unit 205, and therefore the processing load on the target integrated ECU 203 can be reduced.

Figure 5A:
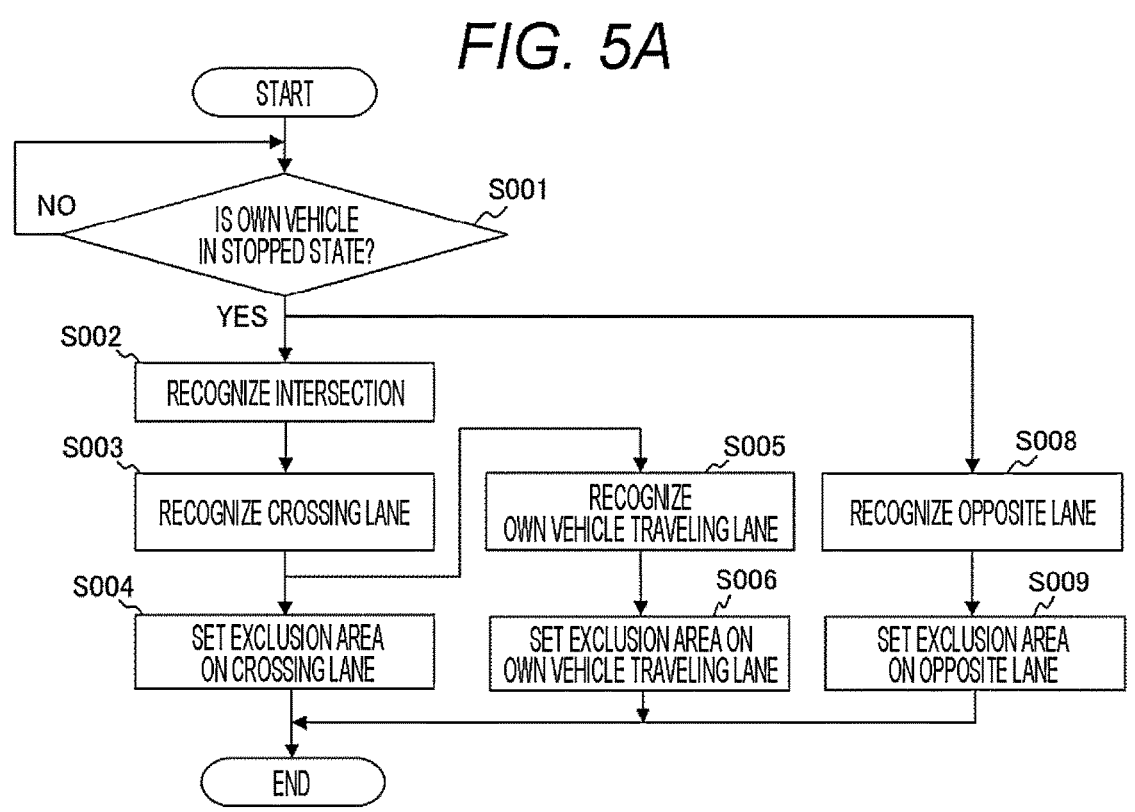
FIG. 5A is a flowchart showing an example of exclusion area setting processing executed by the exclusion area setting unit according to the first embodiment.
Figure 5B:
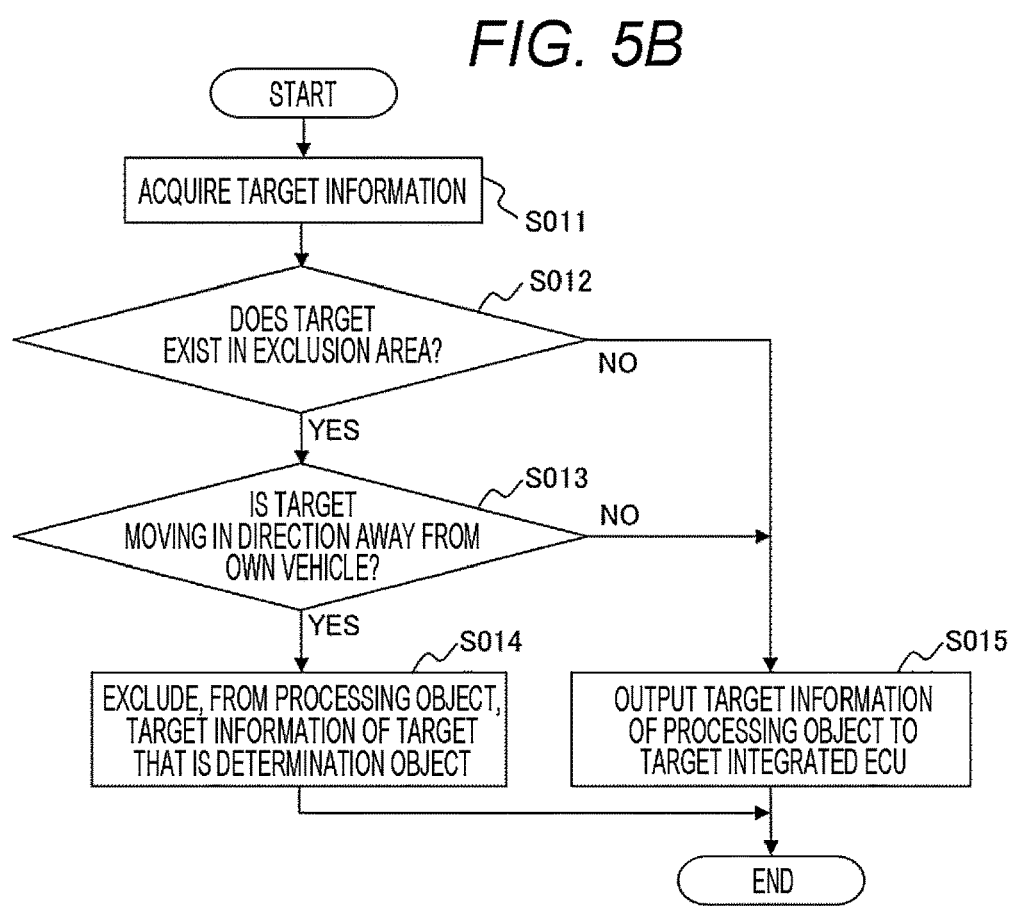
FIG. 5B is a flowchart showing an example of object determination processing executed by an exclusion object determination unit according to the first embodiment.

An example of a flow of processing by the sensor ECU 202 will be described with reference to FIGS. 5A and 5B. FIG. 5A is a flowchart showing an example of exclusion area setting processing executed by the exclusion area setting unit 204, and FIG. 5B is a flowchart showing an example of object determination processing executed by the exclusion object determination unit 205. The processing of the flowcharts shown in FIGS. 5A and 5B is started when, for example, an ignition switch (not illustrated) of the vehicle 101 is turned on, and is repeatedly executed at a predetermined control cycle.

As shown in FIG. 5A, in step S001, the exclusion area setting unit 204 determines whether or not the own vehicle 101 is in a stopped state. When it is determined in step S001 that the own vehicle 101 is in a stopped state, the processing proceeds to steps S002 and S008. Steps S002 and S008 are executed as parallel processing. When it is determined in step S001 that the own vehicle 101 is not in a stopped state, the processing of step S001 is executed again after a predetermined control cycle has elapsed. That is, the processing of step S001 is repeatedly executed until an affirmative determination is made.

In step S002, the exclusion area setting unit 204 executes intersection recognition processing of recognizing an intersection. Specifically, based on the road environment information S1B, S2B, and S3B from the target detection device 208 or the map/position information 207A from the own vehicle position detection device 207, the exclusion area setting unit 204 determines whether or not an intersection exists ahead of the own vehicle 101 in the target detection range.

When it is determined that an intersection exists ahead of the own vehicle 101, the exclusion area setting unit 204 stores, into the storage device, the position of the intersection in the target detection range. The position of the intersection may be stored as a relative position (coordinates in the vehicle body reference coordinate system) with respect to the own vehicle 101, or may be stored as an absolute position (coordinates in the global coordinate system). When the intersection recognition processing of step S002 ends, the processing proceeds to step S003.

In step S003, the exclusion area setting unit 204 executes crossing lane recognition processing of recognizing the crossing lane 301 crossing the road on which the own vehicle 101 travels through the intersection recognized in step S002. The crossing lane 301 is a lane on which a target (another vehicle) travels in a lateral direction with respect to the position of the own vehicle 101.

Specifically, based on the road environment information S1B, S2B, and S3B from the target detection device 208 or the map/position information 207A from the own vehicle position detection device 207, the exclusion area setting unit 204 stores, into the storage device, the position of the crossing lane 301 in the target detection range. The position of the crossing lane 301 may be stored as a relative position (coordinates in the vehicle body reference coordinate system), or may be stored as an absolute position (coordinates in the global coordinate system). When the crossing lane recognition processing of step S003 ends, the processing proceeds to steps S004 and S005. Steps S004 and S005 are executed as parallel processing.

As described above, the exclusion area setting unit 204 determines whether or not the own vehicle 101 is stopped before the crossing lane 301 by the processing of steps S001 to S003.

Upon determining that the own vehicle 101 is stopped before the crossing lane 301, the exclusion area setting unit 204 sets the exclusion area 301a in the crossing lane 301 in step S004.

In a case where two types of lanes exist in the crossing lane 301, i.e., in a case where a lane on the near side as viewed from the own vehicle 101, the lane in which a target (another vehicle) travels from the right side toward the left side, and a lane on the far side as viewed from the own vehicle 101, the lane in which a target (another vehicle) travels from the left side toward the right side, the exclusion area setting unit 204 sets the far lane as the exclusion area 301a.

In step S005, the exclusion area setting unit 204 executes own vehicle traveling lane recognition processing of recognizing the own vehicle traveling lane 302. Specifically, based on the road environment information S1B, S2B, and S3B from the target detection device 208 or the map/position information 207A from t the own vehicle position detection device 207, the exclusion area setting unit 204 stores, into the storage device, the position of the own vehicle traveling lane 302 in the target detection range. The position of the own vehicle traveling lane 302 may be stored as a relative position (coordinates in the vehicle body reference coordinate system), or may be stored as an absolute position (coordinates in the global coordinate system). When the processing of step S005 ends, the processing proceeds to step S006.

In step S006, the exclusion area setting unit 204 sets a region on the far side relative to the crossing lane 301 in the own vehicle traveling lane 302 as the exclusion area 302a.

In step S008, the exclusion area setting unit 204 executes opposite lane recognition processing of recognizing the opposite lane 303. Specifically, based on the road environment information S1B, S2B, and S3B from the target detection device 208 or the map/position information 207A from the own vehicle position detection device 207, the exclusion area setting unit 204 determines whether or not the opposite lane 303 exists on the road on which the own vehicle 101 travels in the target detection range.

When it is determined that the opposite lane 303 exists, the position of the opposite lane 303 in the target detection range is stored in the storage device. The position of the opposite lane 303 may be stored as a relative position (coordinates in the vehicle body reference coordinate system), or may be stored as an absolute position (coordinates in the global coordinate system). When the processing of step S008 ends, the processing proceeds to step S009.

As described above, the exclusion area setting unit 204 determines whether or not the own vehicle 101 is stopped on the road on which the opposite lane 303 exists by the processing of steps S001 and S008.

Upon determining that the own vehicle 101 is stopped on the road on which the opposite lane 303 exists, the exclusion area setting unit 204 sets in step S009 a region behind the own vehicle 101 in the opposite lane 303 as the exclusion area 303a.

When the processing of steps S004, S006, and S009 ends, the processing shown in the flowchart of FIG. 5A ends. Note that when no intersection is recognized in step S002, the exclusion area setting unit 204 regards that the setting processing of the exclusion area in steps S004 and S006 has ended. When no opposite lane is recognized in step S008, the exclusion area setting unit 204 regards that the setting processing of the exclusion area in step S009 has ended.

The flowchart shown in FIG. 5B shows an example of a flow of processing performed for each target detected by the target detection device 208. As shown in FIG. 5B, in step S011, the exclusion object determination unit 205 acquires target information of the target detected by the target detection device 208. The acquired target information includes the position, speed, acceleration, posture, and target ID of the target. When the processing of step S011 ends, the processing proceeds to step S012.

In step S012, based on the target information acquired in step S011, the exclusion object determination unit 205 determines whether or not a target associated with the target information exists in the exclusion areas 301a, 302a, and 303a. By comparing the x coordinates and the y coordinates of the positions a1 to a4, b1 to b4, and c1 to c4 that define the exclusion areas 301a, 302a, and 303a with the x coordinate and the y coordinate representing the position of the target included in the target information, the exclusion object determination unit 205 determines whether or not the target exists in the exclusion area.

Figures 6, 7:
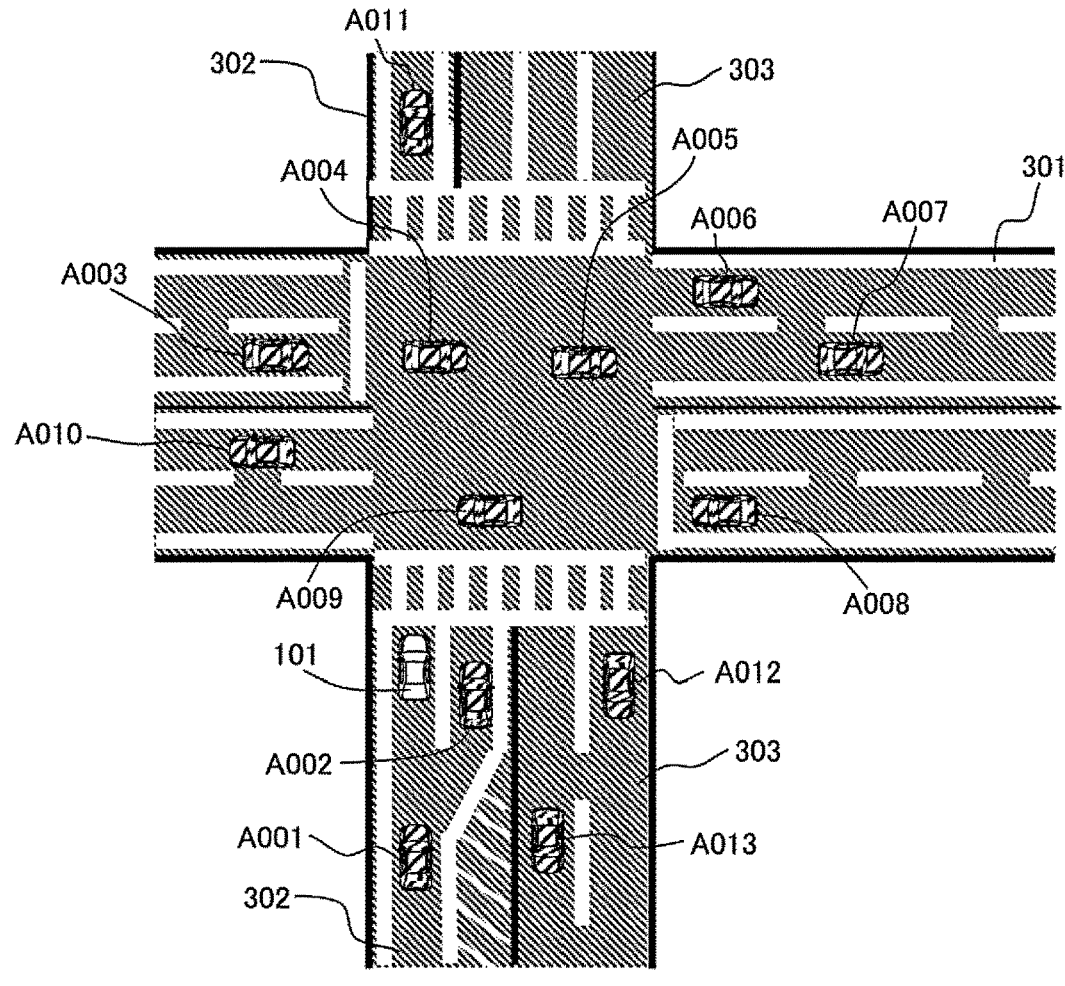
FIG. 6 is a table showing an example of x coordinates and y coordinates of positions a1 to a4 that define an exclusion area.
FIG. 7 is a view illustrating an own vehicle that is waiting at a traffic light before an intersection of two lanes on each side and a plurality of targets (other vehicles) existing in a target detection range.

For example, in a case where the positions a1 to a4 defining the exclusion area 301a have the x coordinates and the y coordinates shown in the table of FIG. 6, when the position of a predetermined target detected by the target detection device 208 has the x coordinate of 23.0 m and the y coordinate of −5.0 m, it is determined that the predetermined target exists in the exclusion area 301a.

When it is determined in step S012 that the target exists in the exclusion areas 301a, 302a, and 303a, the processing proceeds to step S013. When it is determined in step S012 that the target does not exist in the exclusion areas 301a, 302a, and 303a, the processing proceeds to step S015.

In step S013, with reference to speed information of the target (hereinafter, also written as an in-area target) that is the object of determination in step S012, the exclusion object determination unit 205 determines whether or not the in-area target is moving in a direction away from the own vehicle 101.

For example, in a case where the speed information is output with a positive value when a target exists in the opposite lane 303 and the target is approaching the own vehicle 101, and the speed information is output with a negative value when the target is separating from the vehicle 101, it is determined that the in-area target is moving in a direction away from the own vehicle 101 when the speed information of the in-area target is output with a negative value.

Note that whether or not the in-area target is moving in a direction away from the own vehicle 101 may be determined based on a speed vector that is speed information of the in-area target. For example, the exclusion object determination unit 205 predicts the position of an in-area target after a lapse of a predetermined time based on the speed vector of the in-area target at the current time point, and determines that the in-area target is moving in a direction away from the own vehicle 101 when the predicted position is away from the own vehicle 101 relative to the position of the in-area target at the current time point. Whether or not the in-area target is moving in a direction away from the own vehicle 101 may be determined with reference to acceleration information of the in-area target in place of the speed information of the in-area target.

When it is determined in step S013 that the in-area target is moving in a direction away from the own vehicle 101, the processing proceeds to step S014. When it is determined in step S013 that the in-area target is not moving in a direction away from the own vehicle 101, the processing proceeds to step S015.

In step S014, the exclusion object determination unit 205 determines exclusion of the target information of the target that is the object of determination in step S013 from the processing object. Here, methods of excluding the target information from the processing object include a method of deleting the target information from the storage device of the sensor ECU 202. A method of excluding the target information from the processing object may include setting, for the target information, an exclusion flag indicative of having been excluded from the processing object, and not outputting the target information to the target integrated ECU 203.

In step S015, the exclusion object determination unit 205 determines, as a processing object, the target information of the target that is the object of determination in step S013, and outputs the target information of the processing object to the target integrated ECU 203. When the processing of step S014 or step S015 ends, the processing shown in the flowchart of FIG. 5B ends.

Figures 8, 9A:
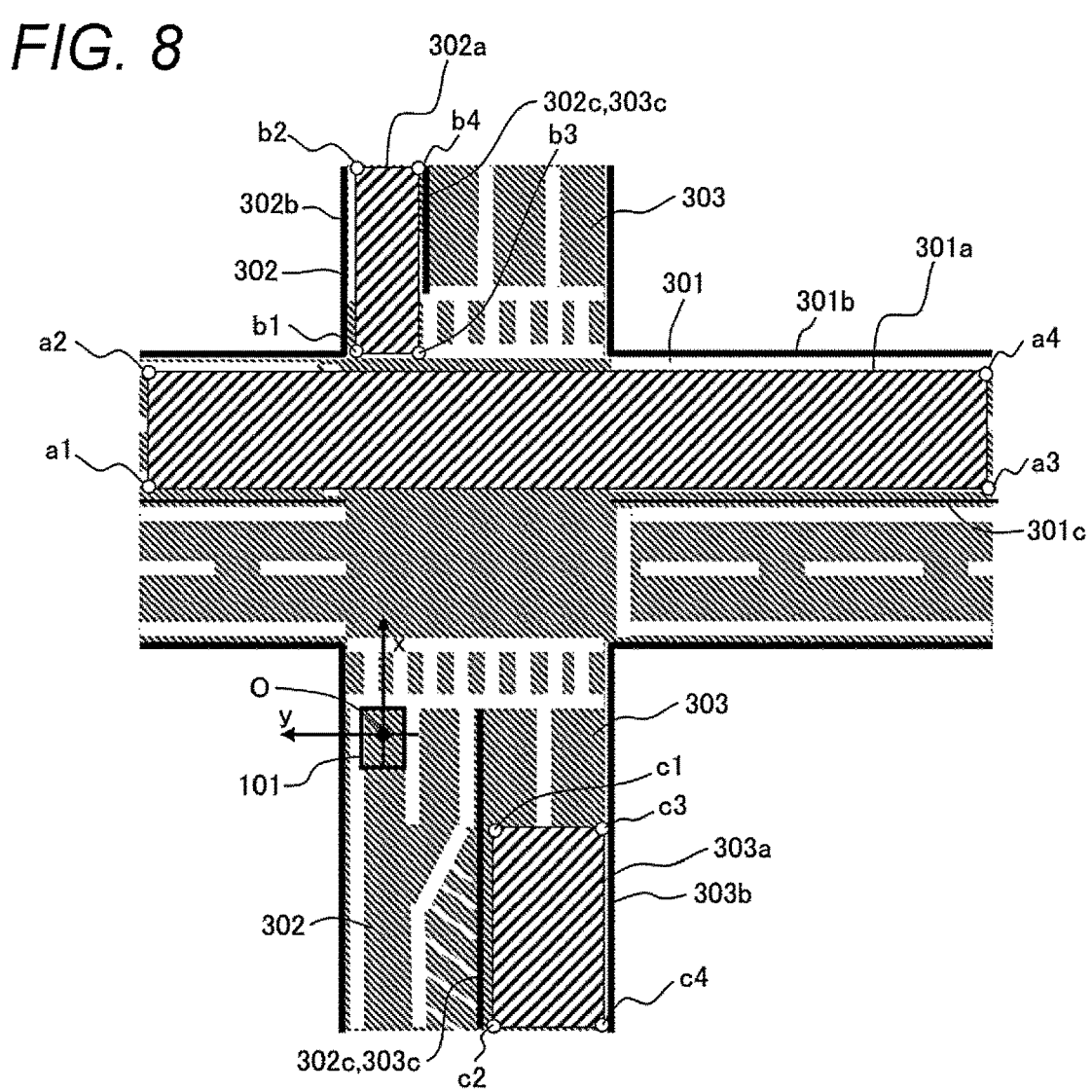
FIG. 8 is a view illustrating an exclusion area set when an own vehicle 101 is stopped at the position illustrated in FIG. 7.
FIG. 9A is a flowchart showing an example of exclusion area setting processing executed by the exclusion area setting unit according to a second embodiment.

A specific example of processing of the electronic control device 200 according to the present first embodiment will be described with reference to FIGS. 7 and 8. FIG. 7 is a view illustrating the own vehicle waiting at a traffic light before an intersection of two lanes on each side and a plurality of targets (other vehicles) existing in the target detection range. FIG. 8 is a view illustrating exclusion areas set when the own vehicle 101 is stopped at the position illustrated in FIG. 7.

In the example illustrated in FIG. 7, the front camera 102 detects targets A003, A004, A005, A006, A009, and A010, the peripheral vision cameras 107 to 110 detect targets A001, A002, A003, A004, A005, A006, A008, A009, A010, A012, and A013, the medium range radars 103 to 106 detect the targets A001, A002, A003, A004, A005, A006, A007, A008, A009, A010, and A012, the long range radar 113 detects the targets A004, A009, and A011, and the laser radars 111 and 112 detect the targets A003, A004, A005, A006, A007, A008, A009, and A010.

As illustrated in FIG. 7, when the own vehicle 101 decelerates and is stopped before a stop line at the intersection, the control device 20 recognizes the intersection, the crossing lane 301, the own vehicle traveling lane 302, and the opposite lane 303. Furthermore, as illustrated in FIG. 8, the control device 20 sets the exclusion area 301a in the crossing lane 301, sets the exclusion area 302a in the own vehicle traveling lane 302, and sets the exclusion area 303a in the opposite lane 303.

The control device 20 excludes, from the processing object, the targets A004, A005, A006, A007, A011, and A013 existing in the exclusion areas 301*a*, 302*a*, and 303*a* and moving in a direction away from the own vehicle 101. The control device 20 determines, as the processing objects, the targets A001, A002, A008, A009, A010, and A012 existing outside the exclusion areas 301*a*, 302*a*, and 303*a*, and the target A003 existing in the exclusion areas 301*a*, 302*a*, and 303*a* and not moving in a direction away from the own vehicle 101.

Here, in a case where exclusion of the processing object described above is not performed, integration and tracking processing of target information for 39 targets is performed. As described above, in a case where exclusion of the processing object is not performed, the target information of the 39 targets is the processing object of the target integration processing. However, in the present first embodiment, the target information of 22 targets is the processing object of the target integration processing, and the number of processing objects is limited.

Specifically, in the present first embodiment, among the targets A001 to A013 illustrated in FIG. 7, integration and tracking processing of the target information of the targets A003, A009, and A010 detected by the front camera 102, the target information of the targets A001, A002, A003, A008, A009, A010, and A012 detected by the peripheral vision cameras 107 to 110, the target information of the targets A001, A002, A003, A008, A009, A010, and A012 detected by the medium range radars 103 to 106, the target information of the target A009 detected by the long range radar 113, and the target information of the targets A003, A008, A009, and A010 detected by the laser radars 111 and 112 are performed.

As described above, in the present embodiment, the processing load of the target integration processing and the tracking processing by the control device 20 can be reduced by excluding, from the processing object, the target information of the target having a low possibility of contact with the own vehicle 101. As a result, the electronic control device 200 can improve the responsiveness of the operation control of an alarm device, a brake device, a steering device, an airbag device, and the like based on the integrated target information generated by the integration processing.

The alarm device is a sound output device such as a speaker, for example. When detecting approach of the own vehicle 101 to the target based on the integrated target information, the electronic control device 200 controls the alarm device and causes the alarm device to output an alarm. The brake device is a device that applies the own vehicle 101 with a braking force and decelerates and stops the own vehicle 101. When detecting approach of the own vehicle 101 to the target based on the integrated target information, the electronic control device 200 controls the brake device and causes the brake device to brake the own vehicle 101. The steering device is a device that steers the wheels. When detecting approach of the own vehicle 101 to the target based on the integrated target information, the electronic control device 200 steers the wheels and avoids contact between the own vehicle 101 and the target. Therefore, improvement of the responsiveness of the operation control of these devices can more appropriately avoid the contact between the own vehicle 101 and the target.

The airbag device includes an airbag housed in a folded state and a gas generator for supplying the airbag with a gas. When detecting approach of the own vehicle 101 to the target based on the integrated target information, the electronic control device 200 controls the airbag device, supplies the airbag with a gas, and deploys the airbag. Therefore, improvement of the responsiveness of the operation control of the airbag device can more appropriately perform protection of the passenger when the own vehicle 101 and the target come into contact with each other.

According to the above-described embodiment, the following operational effects are achieved.

(1) The electronic control device 200 includes the storage device (e.g., the nonvolatile memory of the sensor ECU 202 and the nonvolatile memory of the target integrated ECU 203) that stores target information of a target detected by the plurality of external sensors S installed in the own vehicle 101 that is a vehicle mounted with the electronic control device 200, and a control device 20 that processes the target information stored in the storage device.

The control device 20 acquires information on the environment of the road on which the own vehicle 101 travels and the position of the own vehicle 101. Based on the environment of the road on which the own vehicle 101 travels and the position of the own vehicle 101, the control device 20 sets an exclusion area, which is a region for determining target information to be excluded from a processing object from the target information stored in the storage device, among surrounding regions of the own vehicle 101. The control device 20 determines whether to set the target information as a processing object or exclude the target information from the processing object based on the exclusion area and the target information (the position of the target and the relative speed between the own vehicle 101 and the target in the present first embodiment).

According to this configuration, the exclusion area dynamically changes in accordance with the position of the own vehicle 101 with respect to the road, and a target having a low possibility of contact with the own vehicle 101 is excluded from the processing object. Therefore, according to the present embodiment, it is possible to provide the electronic control device 200 that can appropriately reduce a load of processing using target information of a target detected by the external sensor S in accordance with the environment of the road on which the own vehicle 101 travels and the position of the own vehicle 101.

In the present embodiment, the control device 20 performs processing of integrating the target information of the processing object detected by the plurality of external sensors S and stored in the storage device. In the present embodiment, since the processing object is limited, the processing load of the target integration processing can be reduced.

Since the processing time of the target integration processing can be shortened by reducing the processing load of the target integration processing, responsiveness such as control (e.g., operation control of the alarm device, the brake device, the steering device, the airbag device, and the like) performed based on the integrated target information generated by the target integration processing can be improved. Since the processing load of the target integration processing can be reduced, the number of external sensors S may be increased or new processing may be added. As the new processing, for example, processing in which the target integrated ECU 203 displays a result of target integration information onto a display device is conceivable.

(2) The control device 20 acquires information on the speed of the own vehicle 101 (e.g., wheel speed), and sets the exclusion area based on the environment of the road on which the own vehicle 101 travels and the position and speed of the own vehicle 101.

In the present first embodiment, the control device 20 sets the exclusion area when the wheel speed V of the own vehicle 101 is equal to or less than the predetermined speed Va (Yes in S001 of FIG. 5A). When the wheel speed V of the own vehicle 101 is greater than the predetermined speed Va, the possibility of contact between the own vehicle 101 and the target existing in the surrounding region of the own vehicle 101 becomes higher than that when the wheel speed V of the own vehicle 101 is equal to or less than the predetermined speed Va. Therefore, by setting the exclusion area only when the wheel speed V of the own vehicle 101 is equal to or less than the predetermined speed Va, it is possible to reduce the processing load by limiting the target information of the processing object when the wheel speed V is small while effectively avoiding contact between the own vehicle 101 and the target when the wheel speed V is large.

As described above, since the control device 20 sets the exclusion area in consideration of not only the environment of the road and the position of the own vehicle 101 but also the speed of the own vehicle 101, it is possible to more appropriately perform avoidance of contact between the own vehicle 101 and the target based on the detection result of the external sensor S and reduction of the processing load.

(3) The control device 20 determines whether or not to exclude the target information of the target from the processing object based on the relative speed between the own vehicle 101 and the target existing in the exclusion area (S013 in FIG. 5B). In the present first embodiment, the control device 20 determines whether or not the target existing in the exclusion area is moving in a direction away from the own vehicle 101 based on the relative speed between the own vehicle 101 and the target existing in the exclusion area (S013 in FIG. 5B).

Upon determining that the target existing in the exclusion area is moving in a direction away from the own vehicle 101, the control device 20 determines to exclude the target information of the target used for the determination from the processing object (Yes in S013 in FIG. 5B and S014). Upon determining that the target existing in the exclusion area is not moving in a direction away from the own vehicle 101, the control device 20 determines not to exclude the target information of the target used for the determination from the processing object (No in S013 in FIG. 5B and S015).

The possibility of contact between the own vehicle 101 and a target moving in a direction approaching the own vehicle 101 is higher than the possibility of contact between the own vehicle 101 and a target moving in a direction away from the own vehicle 101. Therefore, it is possible to reduce the processing load by excluding, from the processing object, the target information of the target moving in a direction away from the own vehicle 101, meanwhile effectively avoiding contact between the own vehicle 101 and the target existing in a surrounding region of the own vehicle 101 by excluding, from the processing object, only the target information of the target moving in a direction away from the own vehicle 101.

(4) The control device 20 determines whether or not the own vehicle 101 is stopped before the crossing lane 301, and sets the exclusion area 301a in the crossing lane upon determining that the own vehicle 101 is stopped before the crossing lane 301 (Yes in S001 of FIG. 5A, and S002, S003, and S004).

In this configuration, the target existing in the crossing lane 301 can be excluded from the processing object. In particular, in the present first embodiment, the exclusion area 301a is set in a lane on the far side as viewed from the own vehicle 101 in the crossing lane 301 (see FIGS. 4 and 8). This can appropriately exclude target information of a target having a low possibility of coming into contact with the own vehicle 101 and reduce the processing load of the electronic control device 200.

(5) The control device 20 determines whether or not the own vehicle 101 is stopped on the road on which the opposite lane 303 exists, and upon determining that the own vehicle 101 is stopped on the road on which the opposite lane 303 exists, sets the exclusion area 303a (see FIGS. 4 and 8) behind the own vehicle 101 in the opposite lane 303 (Yes in step S001 of FIG. 5A, and S008 and S009).

This configuration can exclude, from the processing object, the target information of the target existing in the exclusion area 303a, which is a target having a low possibility of coming into contact with the own vehicle 101. As a result, it is possible to reduce the processing load of the electronic control device 200.

Second Embodiment

The electronic control device 200 according to the second embodiment of the present invention will be described with reference to FIGS. 9A to 11. Note that the identical or corresponding configurations as those described in the first embodiment will be given the identical reference numerals, and differences will be mainly described. Since the configuration of the vehicle 101 mounted with the electronic control device 200 according to the second embodiment is similar to that of the first embodiment, the description thereof will be omitted.

In the first embodiment, an example in which the exclusion area setting unit 204 sets the exclusion area based on the environment of the road on which the own vehicle 101 travels and the position and speed of the own vehicle 101 has been described.

On the other hand, in the second embodiment, the exclusion area setting unit 204 sets the exclusion area based on the environment of the road on which the own vehicle 101 travels and the position of the own vehicle 101. That is, the control device 20 according to the second embodiment sets the exclusion area without considering the speed of the own vehicle 101.

Figure 9B:
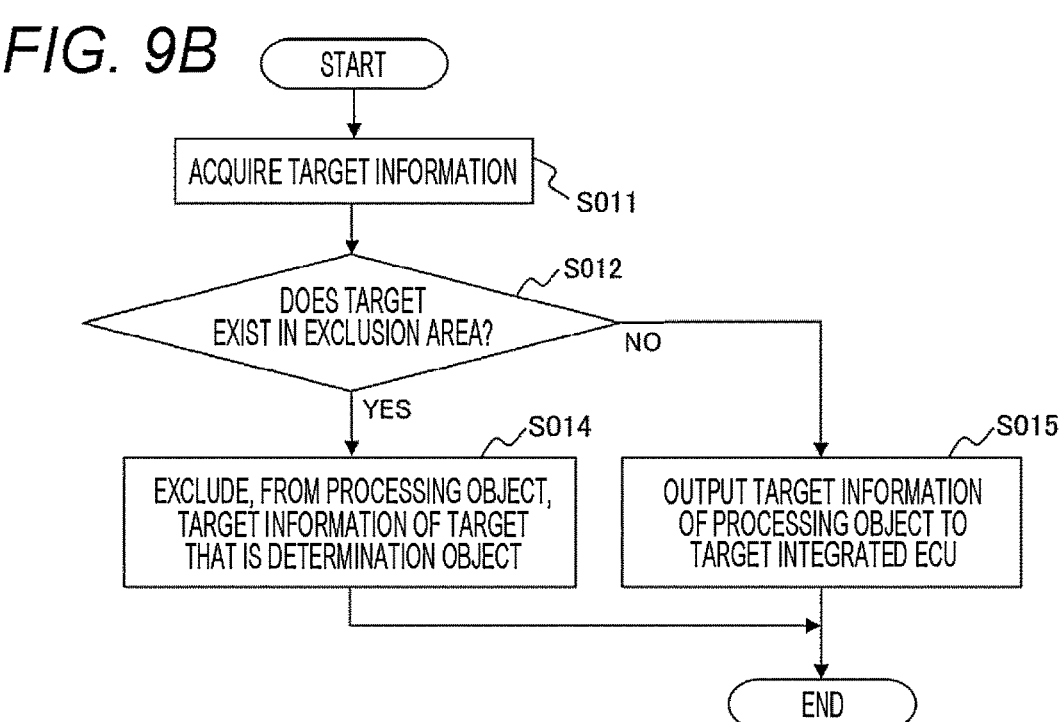
FIG. 9B is a flowchart showing an example of object determination processing executed by an exclusion object determination unit according to the second embodiment.

FIG. 9A is a flowchart showing an example of exclusion area setting processing executed by the exclusion area setting unit 204 according to the second embodiment, and FIG. 9B is a flowchart showing an example of object determination processing executed by the exclusion object determination unit 205 according to the second embodiment.

Figure 10:
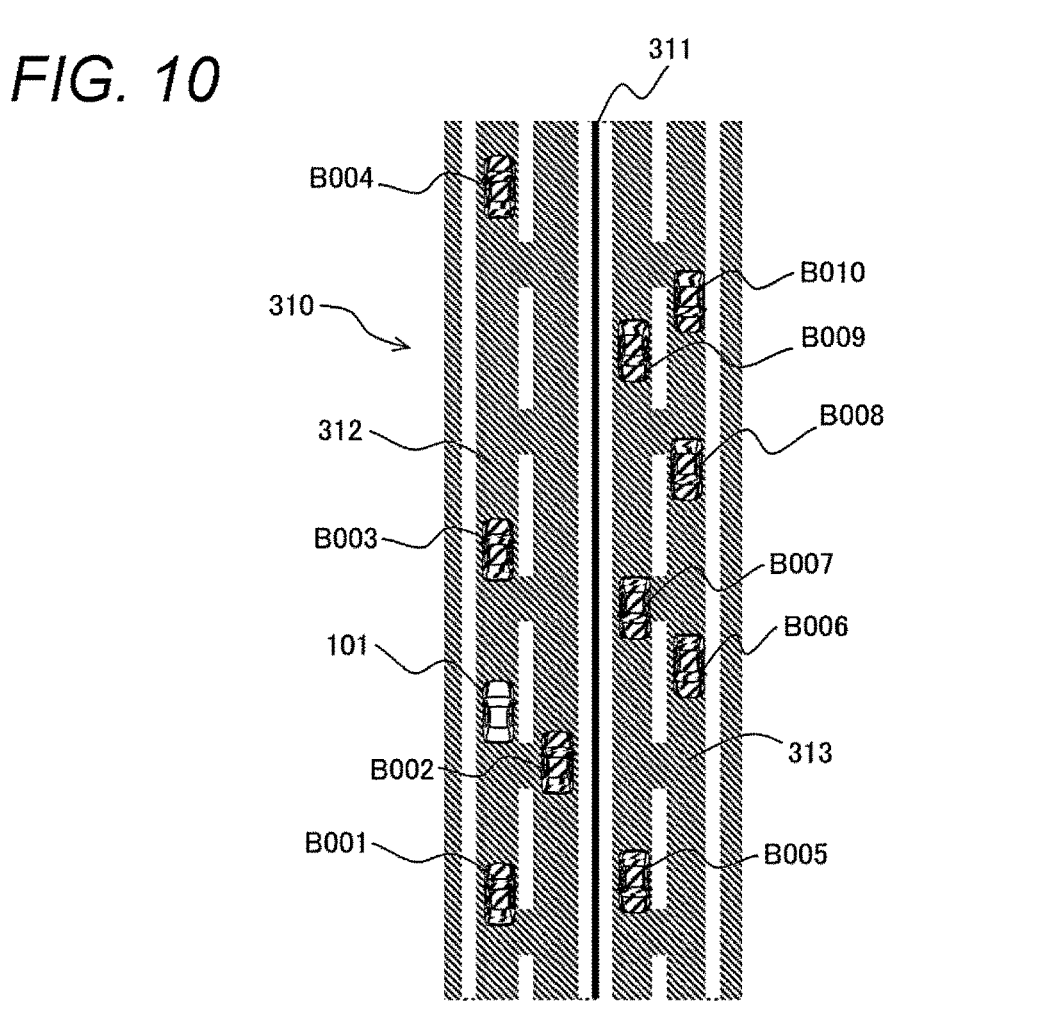
FIG. 10 is a schematic plan view of a road on which a median strip exists, and illustrates the own vehicle and other vehicles (targets) traveling on the road.
Figure 11:
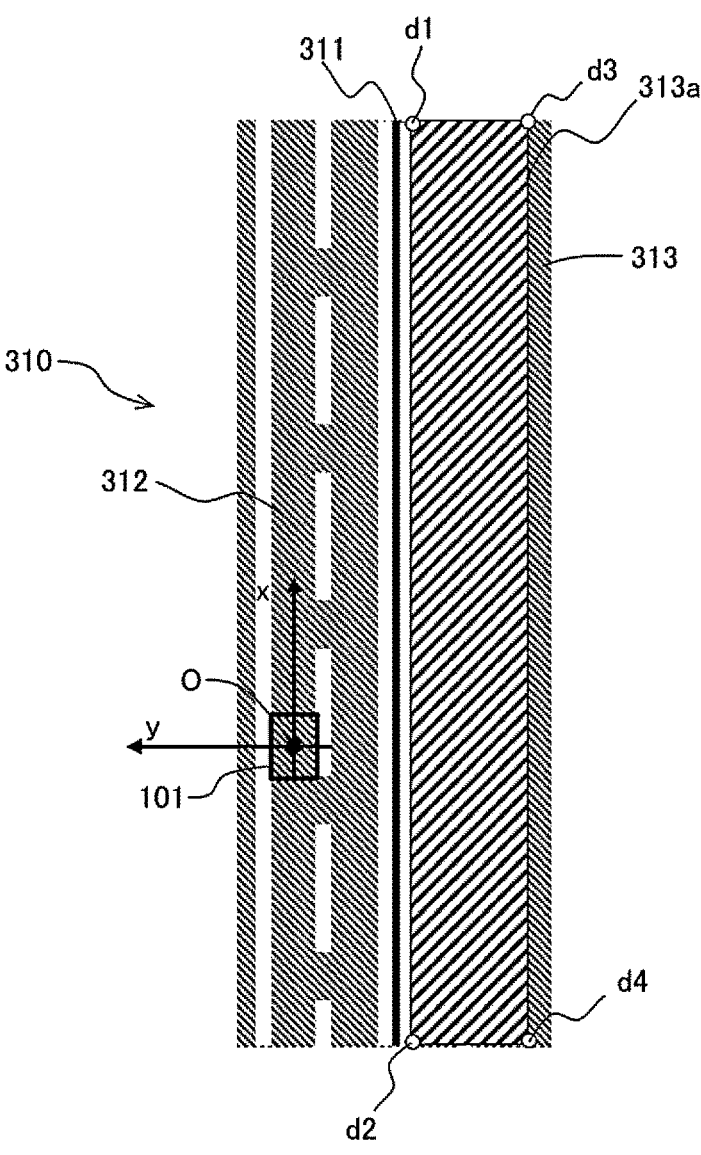
FIG. 11 is a schematic plan view of a road on which a median strip exists, and illustrates an exclusion area set on an opposite lane.

FIG. 10 is a schematic plan view of a road 310 on which a median strip 311 exists, and illustrates the own vehicle 101 and other vehicles (targets) traveling on the road 310. FIG. 11 is a schematic plan view of the road 310 on which the median strip 311 exists, and illustrates an exclusion area 313a set in an opposite lane 313.

The processing of the flowcharts shown in FIGS. 9A and 9B is started when, for example, an ignition switch (not illustrated) of the vehicle 101 is turned on, and is repeatedly executed at a predetermined control cycle.

As illustrated in FIG. 10, on the road 310 such as an expressway or a ring road in which an own vehicle traveling lane 312 and the opposite lane 313 are separated by the median strip 311, other vehicles traveling on the opposite lane 313 cannot easily enter the own vehicle traveling lane 312 over the median strip 311 formed of concrete, vegetation, and the like.

That is, the possibility that another vehicle traveling in the opposite lane 313 comes into contact with the own vehicle 101 is lower than the possibility that another vehicle traveling in the own vehicle traveling lane 312 comes into contact with the own vehicle 101. Therefore, it can be said that target information of a target (another vehicle) traveling on the opposite lane 313 is information unnecessary for driving assistance and control of self-driving of the vehicle 101.

Therefore, in the present second embodiment, as illustrated in FIG. 11, on the road 310 on which the median strip 311 exists, the exclusion area 313a is set in the opposite lane 313, target information of a target (another vehicle) in the exclusion area 313a is excluded from a processing object, and the number of pieces of target information output from a sensor ECU 202 to a target integrated ECU 203 is limited.

As presented in FIGS. 9A and 10, in step S020, the exclusion area setting unit 204 executes median strip recognition processing of recognizing the median strip 311 of the road 310 on which the own vehicle 101 travels.

Specifically, based on the road environment information S1B, S2B, and S3B from the target detection device 208 or the map/position information 207A from the own vehicle position detection device 207, the exclusion area setting unit 204 determines whether or not the median strip 311 exists on the road 310 on which the own vehicle 101 travels in the target detection range.

When it is determined in step S020 that the median strip 311 exists on the road 310 on which the own vehicle 101 travels, the processing proceeds to step S021. When it is determined in step S020 that the median strip 311 does not exist on the road 310 on which the own vehicle 101 travels, determination processing as to whether or not the median strip 311 exists is performed again after a predetermined control cycle has elapsed.

In step S021, the exclusion area setting unit 204 executes processing of recognizing the opposite lane 313. Specifically, based on the road environment information S1B, S2B, and S3B from the target detection device 208 or the map/position information 207A from the own vehicle position detection device 207, the exclusion area setting unit 204 stores, into the storage device, the position of the opposite lane 313 in the target detection range. The position of the opposite lane 313 may be stored as a relative position (coordinates in the vehicle body reference coordinate system), or may be stored as an absolute position (coordinates in the global coordinate system). When the processing of step S021 ends, the processing proceeds to step S022.

As presented in FIGS. 9A and 11, in step S022, the exclusion area setting unit 204 sets the exclusion area 313a from the front to the rear of the own vehicle 101 in the opposite lane 313. In the present second embodiment, the coordinates of the positions d1 to d4 of the four corners of the exclusion area 313a are calculated such that the entire opposite lane 313 in the target detection range falls within the exclusion area 313a, and the calculation result is stored in the storage device.

The flowchart of FIG. 9B is different from the flowchart of FIG. 5B in that the processing of step S013 is omitted from the flowchart of FIG. 5B. As shown in FIG. 9B, in step S012, based on the target information acquired in step S011, the exclusion object determination unit 205 determines whether or not the target associated with the target information exists in the exclusion area 313a. When it is determined in step S012 that the target exists in the exclusion area 313a, the processing proceeds to step S014. When it is determined in step S012 that the target does not exist in the exclusion area 313a, the processing proceeds to step S015.

In step S014, the exclusion object determination unit 205 determines exclusion of the target information of the target that is the object of determination in step S012 from the processing object. In step S015, the exclusion object determination unit 205 determines, as a processing object, the target information of the target that is the object of determination in step S012, and outputs the target information of the processing object to the target integrated ECU 203.

A specific example of processing of the electronic control device 200 according to the present second embodiment will be described with reference to FIGS. 10 and 11. In the example illustrated in FIG. 10, in the target detection range, targets (other vehicles) B001 to B004 traveling in the own vehicle traveling lane 312 and targets (other vehicles) B005 to B010 traveling in the opposite lane 313 beyond the median strip 311 exist.

The front camera 102 detects the target B003, the peripheral vision cameras 107 to 110 detect the targets B001, B002, B003, B005, B006, B007, B008, and B009, the medium range radars 103 to 106 detect the targets B001, B002, B003, B005, B006, B007, B008, and B009, the long range radar 113 detects the target B003, and the laser radars 111 and 112 detect the targets B003, B007, B008, and B009. Note that since the target B009 is positioned between the own vehicle 101 and the target B010, the target B010 is not detected by the target detection device 208. Similarly, since the target B003 is positioned between the own vehicle 101 and the target B004, the target B004 is not detected by the target detection device 208.

As illustrated in FIG. 10, when the own vehicle 101 is traveling on the road 310 where the median strip 311 exists, the control device 20 recognizes the median strip 311, the own vehicle traveling lane 312, and the opposite lane 313. Furthermore, as illustrated in FIG. 11, the control device 20 sets the exclusion area 313a in the opposite lane 313.

As illustrated in FIGS. 10 and 11, the control device 20 excludes, from the processing object, the targets B005 to B009 detected by the target detection device 208 among the targets B005 to B010 existing in the exclusion area 313a. The control device 20 determines, as the processing object, the target information of the targets B001 to B003 detected by the target detection device 208 among the targets B001 to B004 existing in the own vehicle traveling lane 312.

Here, in a case where exclusion of the processing object described above is not performed, integration and tracking processing of target information for 22 targets is performed. As described above, in a case where exclusion of the processing object is not performed, the target information of the 22 targets is the processing object of the target integration processing. However, in the present second embodiment, the target information of 9 targets is the processing object of the target integration processing, and the number of processing objects is limited.

Specifically, in the present second embodiment, among the targets B001 to B010 illustrated in FIG. 10, integration and tracking processing of the target information of the target B003 detected by the front camera 102, the target information of the targets B001, B002, and B003 detected by the peripheral vision cameras 107 to 110, the target information of the targets B001, B002, and B003 detected by the medium range radars 103 to 106, the target information of the target B003 detected by the long range radar 113, and the target B003 detected by the laser radars 111 and 112 are performed.

As described above, the control device 20 according to the present second embodiment determines whether or not the median strip 311 exists on the road 310 on which the own vehicle 101 travels, and upon determining that the median strip 311 exists on the road 310 on which the own vehicle 101 travels, sets the exclusion area 313*a* from the front to the rear of the own vehicle 101 in the opposite lane 313.

In this configuration, as in the first embodiment, target information of a target having a low possibility of contact with the own vehicle 101 is excluded from the processing object. Therefore, the processing load of the target integration processing and the tracking processing by the control device 20 can be reduced.

Third Embodiment

The electronic control device 200 according to the third embodiment of the present invention will be described with reference to FIGS. 12 to 14. Note that the identical or corresponding configurations as those described in the first embodiment will be given the identical reference numerals, and differences will be mainly described. Since the configuration of the vehicle 101 mounted with the electronic control device 200 according to the third embodiment is similar to that of the first embodiment, the description thereof will be omitted.

The third embodiment is different from the first embodiment in the content of the exclusion area setting processing executed by an exclusion area setting unit 204. In the first embodiment, an example in which the number of pieces of target information of another vehicle that is a target is limited has been described, but the target detected by the target detection device 208 is not limited to the other vehicle. The target detection device 208 also detects a pedestrian, a bicycle, and the like as targets. Therefore, it is preferable to exclude, from the processing object, target information of a target having a low possibility of contact with the own vehicle 101 among targets such as a pedestrian and a bicycle. The control device according to the present third embodiment excludes, from the processing object, target information of a target having a low possibility of contact with the own vehicle 101 among target information of a pedestrian, a bicycle, and the like passing through a walkway and a crosswalk.

Figure 12:
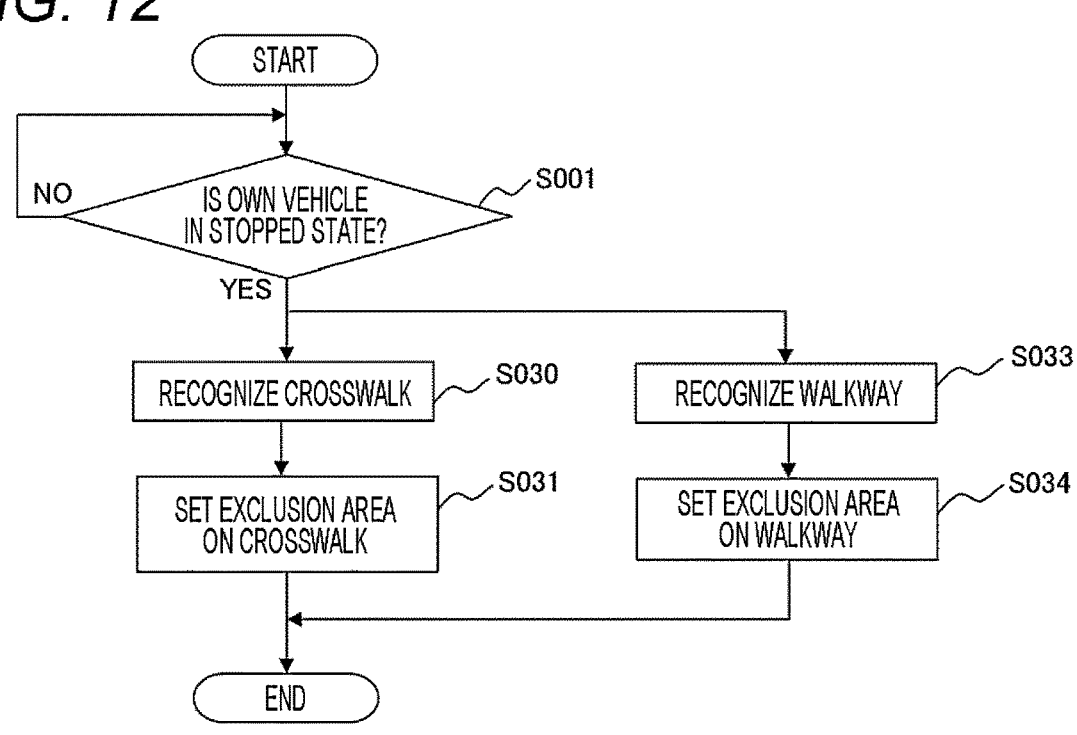
FIG. 12 is a flowchart showing an example of exclusion area setting processing executed by the exclusion area setting unit according to a third embodiment.

FIG. 12 is a flowchart showing an example of the exclusion area setting processing executed by the exclusion area setting unit 204 according to the third embodiment. In the flowchart of FIG. 12, the processing of steps S030 to S034 is executed in place of the processing of steps S002 to S009 of the flowchart of FIG. 5A.

Figure 13:
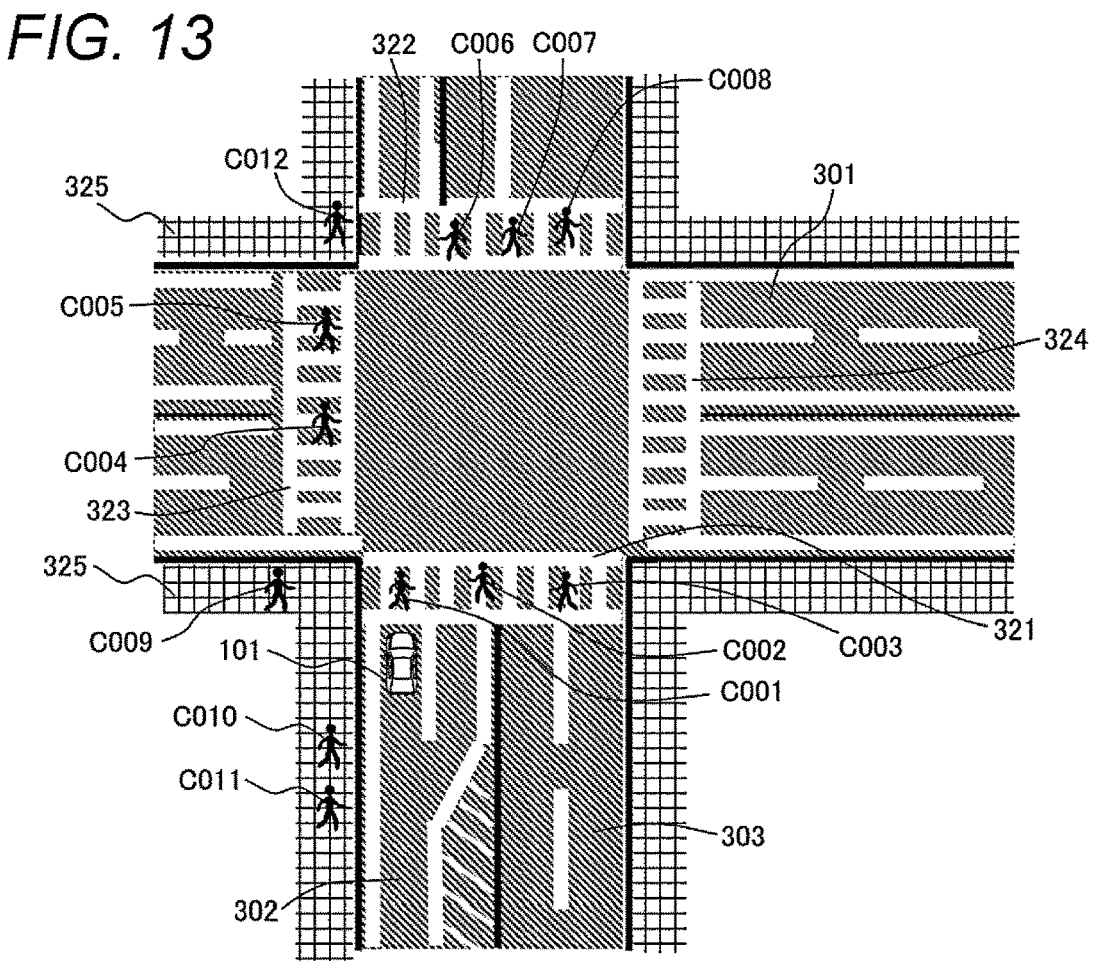
FIG. 13 is a schematic plan view of an intersection and a periphery thereof, and illustrates the own vehicle waiting at a traffic light at the intersection, and pedestrians (targets) walking on walkways and crosswalks.

FIG. 13 is a schematic plan view of an intersection and a periphery thereof, and illustrates own vehicle 101 waiting at a traffic light at the intersection, and pedestrians (targets) walking on a walkway 325 and crosswalks 321 to 324. FIG. 14 is a schematic plan view of an intersection and a periphery thereof, and illustrates the exclusion areas 322*a* and 323*a*, and 325*a* set in the walkway 325 and the crosswalks 321 to 324. Note that the walkway refers to a part of a road provided side by side with a roadway and structurally partitioned for passage of pedestrians. The crosswalk refers to a region indicated on a roadway by a white line or the like for passage of pedestrians.

As illustrated in FIG. 13, in a state in which the own vehicle 101 is stopped before the intersection, targets C006, C007, and C008 walking on the crosswalk (hereinafter, also written as a far-side crosswalk) 322 on the far side of the intersection, i.e., in front of the crossing lane 301 are farther in distance from the own vehicle 101 than targets C001, C002, and C003 walking on the crosswalk (hereinafter, also written as a near-side crosswalk) 321 on the near side of the intersection. Targets C004 and C005 walking on the crosswalk (hereinafter, also written as a left-side crosswalk) 323 on the left side of the intersection, i.e., on the left side of the crossing lane 301 relative to the own vehicle traveling lane are farther in distance from the own vehicle 101 than the targets C001, C002, and C003 walking on the crosswalk 321. Therefore, the possibility that the target walking on the crosswalks 322 and 323 comes into contact with the own vehicle 101 is lower than the possibility that the target walking on the crosswalk 321 comes into contact with the own vehicle 101.

Note that in the present third embodiment, the crosswalk (hereinafter, also written as a right-side crosswalk) 324 on the right side relative to the intersection, i.e., on the right side relative to the own vehicle traveling lane 302 in the crossing lane 301 is outside the target detection range.

The near-side crosswalk 321 is a crosswalk through which the own vehicle 101 passes to enter the intersection. The near-side crosswalk 321 is a crosswalk existing ahead of the own vehicle 101 and existing at a position closest to the own vehicle 101 among crosswalks recognized by the control device 20. The far-side crosswalk 322, the left-side crosswalk 323, and the right-side crosswalk 324 are crosswalks through which the own vehicle 101 passes to exit the intersection after entering the intersection.

When the own vehicle 101 starts, the possibility that the target walking in a region in the rear of the own vehicle 101 in the walkway 325 comes into contact with the own vehicle 101 is lower than the possibility that the targets walking in regions on the side and in the front of the own vehicle 101 in the walkway 325 come into contact with the own vehicle 101.

Figure 14:
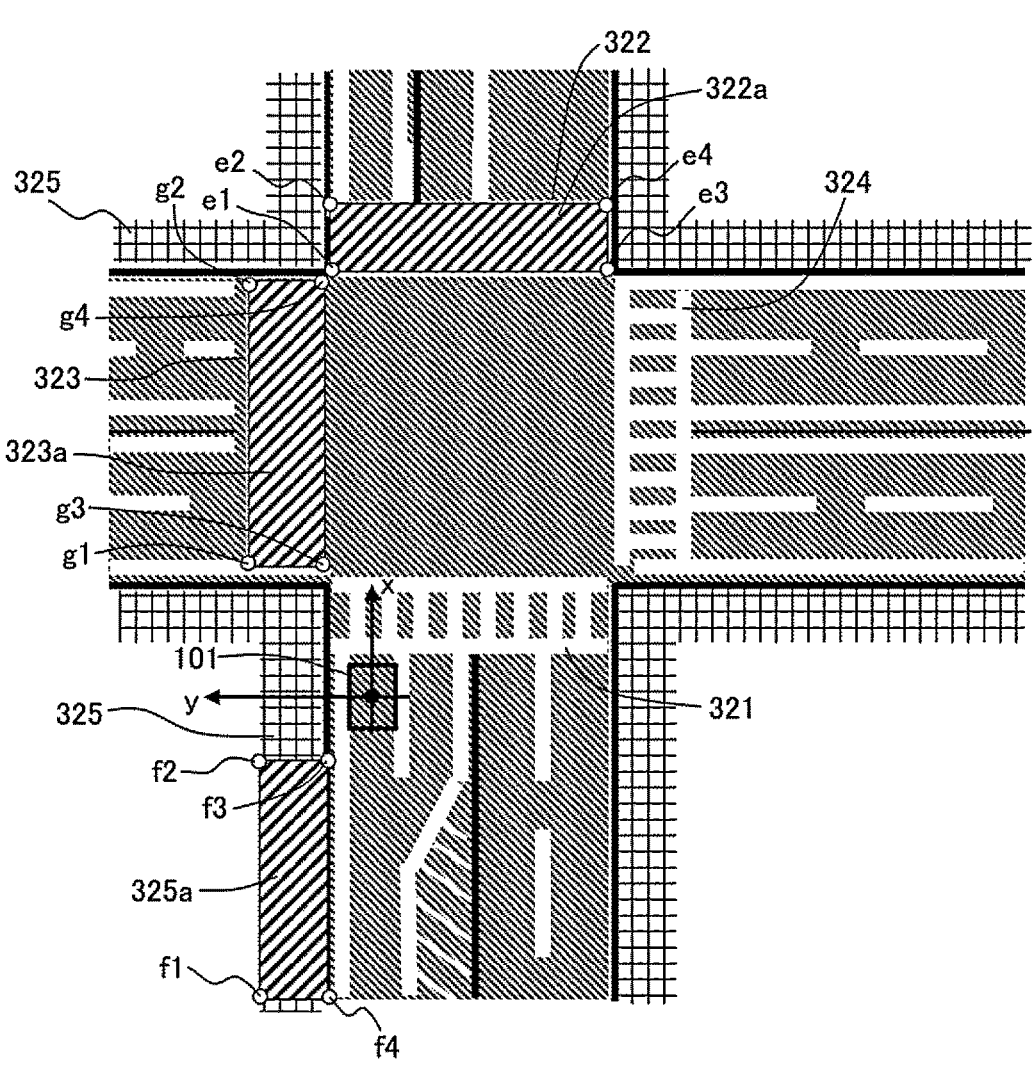
FIG. 14 is a schematic plan view of an intersection and a periphery thereof, and illustrates exclusion areas set on a walkway and crosswalks.

Therefore, in the present third embodiment, as illustrated in FIG. 14, the exclusion areas 322*a* and 323*a*, and 325*a* are set in the entire crosswalks 322 and 323 and in a region behind the own vehicle 101 on the walkway 325, the target information of the target in the exclusion areas 322*a* and 323*a*, and 325*a* is excluded from the processing object, and the number of target information output from the sensor ECU 202 to the target integrated ECU 203 is limited.

As presented in FIGS. 12 and 13, when it is determined in step S001 that the own vehicle 101 is in a stopped state, the processing proceeds to steps S030 and S033. Steps S030 and S033 are executed as parallel processing.

In step S030, the exclusion area setting unit 204 executes crosswalk recognition processing of recognizing a crosswalk. Specifically, based on the road environment information S1B, S2B, and S3B from the target detection device 208 or the map/position information 207A from the own vehicle position detection device 207, the exclusion area setting unit 204 determines whether or not a crosswalk exists at the intersection in front of the own vehicle 101 in the target detection range.

Upon determining that a crosswalk exists at the intersection in front of the own vehicle 101, the exclusion area setting unit 204 stores, into the storage device, the position of the crosswalk with respect to the own vehicle 101. The position of the crosswalk may be stored as a relative position (coordinates in the vehicle body reference coordinate system) with respect to the own vehicle 101, or may be stored as an absolute position (coordinates in the global coordinate system). When the crosswalk recognition processing of step S030 ends, the processing proceeds to step S031.

As described above, the exclusion area setting unit 204 determines whether or not the own vehicle 101 is stopped before the crosswalk at the intersection by the processing of steps S001 and S030.

As presented in FIGS. 12 and 14, upon determining that the own vehicle 101 is stopped before the crosswalk at the intersection, the exclusion area setting unit 204 sets in step S031 the exclusion area in a crosswalk other than near-side crosswalk 321 among the plurality of crosswalks recognized in step S030.

In the example illustrated in FIG. 14, the exclusion area setting unit 204 sets the exclusion area 322a by calculating and storing, into the storage device, positions e1, e2, e3, and e4 of the four corners of the exclusion area 322a. The exclusion area setting unit 204 sets the exclusion area 323a by calculating and storing, into the storage device, positions g1, g2, g3, and g4 of the four corners of the exclusion area 322a. Note that in the example illustrated in FIG. 14, since right-side crosswalk 324 is outside the target detection range, no exclusion area is set in the right-side crosswalk 324. As described above, the exclusion area setting unit 204 sets the exclusion areas 322a and 323a in the crosswalks 322 and 323 recognized other than the near-side crosswalk 321.

As presented in FIGS. 12 and 13, in step S033, the exclusion area setting unit 204 executes walkway recognition processing of recognizing a walkway. Specifically, based on the road environment information S1B, S2B, and S3B from the target detection device 208 or the map/position information 207A from the own vehicle position detection device 207, the exclusion area setting unit 204 determines whether or not a walkway exists in the target detection range.

Upon determining that a walkway exists, the exclusion area setting unit 204 stores, into the storage device, the position of the walkway with respect to the own vehicle 101. The position of the walkway may be stored as a relative position (coordinates in the vehicle body reference coordinate system) with respect to the own vehicle 101, or may be stored as an absolute position (coordinates in the global coordinate system). When the walkway recognition processing of step S033 ends, the processing proceeds to step S034.

As described above, the exclusion area setting unit 204 determines whether or not the own vehicle 101 is stopped on a road on which a walkway exists by the processing of steps S001 and S033.

As presented in FIGS. 12 and 14, upon determining that the own vehicle 101 is stopped on the road on which the walkway exists, the exclusion area setting unit 204 sets in step S034 the exclusion area 325a in a region behind the own vehicle 101 on the walkway 325 recognized in step S033.

In the example illustrated in FIG. 14, the exclusion area setting unit 204 sets the exclusion area 325a by calculating and storing, into the storage device, positions f1, f2, f3, and f4 of the four corners of the exclusion area 325a.

When the processing of steps S031 and S034 ends, the processing shown in the flowchart of FIG. 12 ends. Note that in a case where the crosswalk is not recognized in step S030, the exclusion area setting unit 204 regards that the setting processing of the exclusion area of step S031 has ended. In a case where the walkway is not recognized in step S033, the exclusion area setting unit 204 regards that the setting processing of the exclusion area of step S034 has ended.

Since the flow of the flow of the object determination processing executed by the exclusion object determination unit 205 is similar to the flow (see FIG. 9B) described in the second embodiment, the description thereof will be omitted.

A specific example of processing of the electronic control device 200 according to the present third embodiment will be described with reference to FIGS. 13 and 14. In the example illustrated in FIG. 13, the front camera 102 detects the targets C001, C002, C004, C005, C006, and C007, the peripheral vision cameras 107 to 110 detect the targets C001, C002, C003, C004, C005, C009, C010, and C011, the medium range radars 103 to 106 detect the targets C001, C002, C003, C004, C005, C009, C010, and C011, the long range radar 113 detects the targets C001, C006, and C012, and the laser radars 111 and 112 detect the targets C001, C002, C003, C004, C005, and C009.

As illustrated in FIG. 13, when the own vehicle 101 is waiting at a traffic light before the intersection, the control device 20 recognizes the plurality of crosswalks 321 to 323 and the walkway 325. Note that in the present third embodiment, since the crosswalk 324 is outside the target detection range, it is not recognized by the control device 20. Furthermore, as illustrated in FIG. 14, the control device 20 sets the exclusion areas 322a and 323a, 325a in the crosswalks 322 and 323 and the walkway 325.

As illustrated in FIGS. 13 and 14, the control device 20 excludes, from the processing object, the target objects C004 to C008 existing in the exclusion areas 322a and 323a of the crosswalks 322 and 323. The control device 20 excludes, from the processing object, the target objects C010 and C011 existing in the exclusion area 325a of the walkway 325. The control device 20 determines, as the processing object, the target information of the target detected by the target detection device 208 among targets existing outside the exclusion area 325a.

Here, in a case where exclusion of the processing object described above is not performed, integration and tracking processing of target information for 31 targets is performed. As described above, in a case where exclusion of the processing object is not performed, the target information of the 31 targets is the processing object of the target integration processing. However, in the present third embodiment, the target information of 16 targets is the processing object of the target integration processing, and the number of processing objects is limited.

Specifically, among the targets C001 to C012 illustrated in FIG. 13, integration and tracking processing of the target information of the targets C001 and C002 detected by the front camera 102, the target information of the targets C001, C002, C003, and C009 detected by the peripheral vision cameras 107 to 110, the target information of the targets C001, C002, C003, and C009 detected by the medium range radars 103 to 106, the target information of the targets C001 and C012 detected by the long range radar 113, and the target information of the targets C001, C002, C003, and C009 detected by the laser radars 111 and 112 are performed.

As described above, the control device 20 according to the present third embodiment determines whether or not the own vehicle 101 is stopped before the crosswalk 321. Upon determining that the own vehicle 101 is stopped before the crosswalk 321, the control device 20 sets the exclusion areas 322a and 323a in the crosswalks 322 and 323 recognized other than the crosswalk 321 (Yes in S001 of FIG. 12, and S030 and S031).

This configuration can reduce the processing load of the electronic control device 200 by excluding, from the processing object, the target information of the target such as a pedestrian walking on the crosswalks 322 and 323, which is a target having a low possibility of coming into contact with the own vehicle 101.

In particular, in the present third embodiment, in a case where the own vehicle 101 is stopped before the crosswalk 321 at the intersection with a large traffic volume, the control device 20 sets the exclusion areas 322a and 323a in the crosswalks 322 and 323 other than the near-side crosswalk 321. The control device 20 according to the present third embodiment determines whether or not the own vehicle 101 is stopped before the intersection (S001 and S030 of FIG. 12). Furthermore, upon determining that the own vehicle 101 is stopped before the intersection, the control device 20 sets the exclusion areas 322a and 323a in the crosswalks 322 and 323 through which the own vehicle 101 passes to exit from the intersection after entering the intersection (S031 of FIG. 12), and does not set the exclusion area 321a in the crosswalk 321 through which the own vehicle 101 passes to enter the intersection.

This configuration can reduce the processing load of the electronic control device 200 by excluding, from the processing object, the target information of a target having a low possibility of coming into contact with the own vehicle 101 among the target information of the targets such as many pedestrians when the own vehicle 101 is stopped before the crosswalk 321 at the intersection with a large traffic volume.

In the present third embodiment, the control device 20 determines whether or not the own vehicle 101 is stopped on the road on which the walkway 325 exists (S001 and S033 of FIG. 12). Furthermore, upon determining that the own vehicle 101 is stopped on the road on which walkway 325 exists, the control device 20 sets the exclusion area 325a behind the own vehicle 101 on the walkway 325 (S034 in FIG. 12).

This configuration can reduce the processing load of the electronic control device 200 by excluding, from the processing object, the target information of a target such as a pedestrian traveling on the walkway 325 behind the own vehicle 101.

Modification of Third Embodiment

In the third embodiment, an example in which the flow of the flow of the object determination processing executed by the exclusion object determination unit 205 is similar to the flow (see FIG. 9B) described in the second embodiment has been described, but the present invention is not limited to this. The flow of the flow of the object determination processing executed by the exclusion object determination unit 205 may be similar to the flow (see FIG. 5B) described in the first embodiment.

Fourth Embodiment

The electronic control device 200 according to the fourth embodiment of the present invention will be described with reference to FIGS. 7, 8, and 15. Note that the identical or corresponding configurations as those described in the first embodiment will be given the identical reference numerals, and differences will be mainly described. Since the configuration of the vehicle 101 mounted with the electronic control device 200 according to the fourth embodiment is similar to that of the first embodiment, the description thereof will be omitted.

In the first embodiment, the target A012 illustrated in FIG. 7 is a processing object. However, the target A102 enters the exclusion area 303a (see FIG. 8) set in the opposite lane 303 after a predetermined time has elapsed, and moves away from the own vehicle 101. That is, it can be said that the target A102 has a low possibility of contact with the own vehicle 101. Therefore, in the present fourth embodiment, the target information of a target that moves in a direction away from the own vehicle 101 and is predicted to enter the exclusion area, even if the target exists outside the exclusion area, is excluded from the processing object. This can further reduce the processing load of the electronic control device 200.

Figure 15:
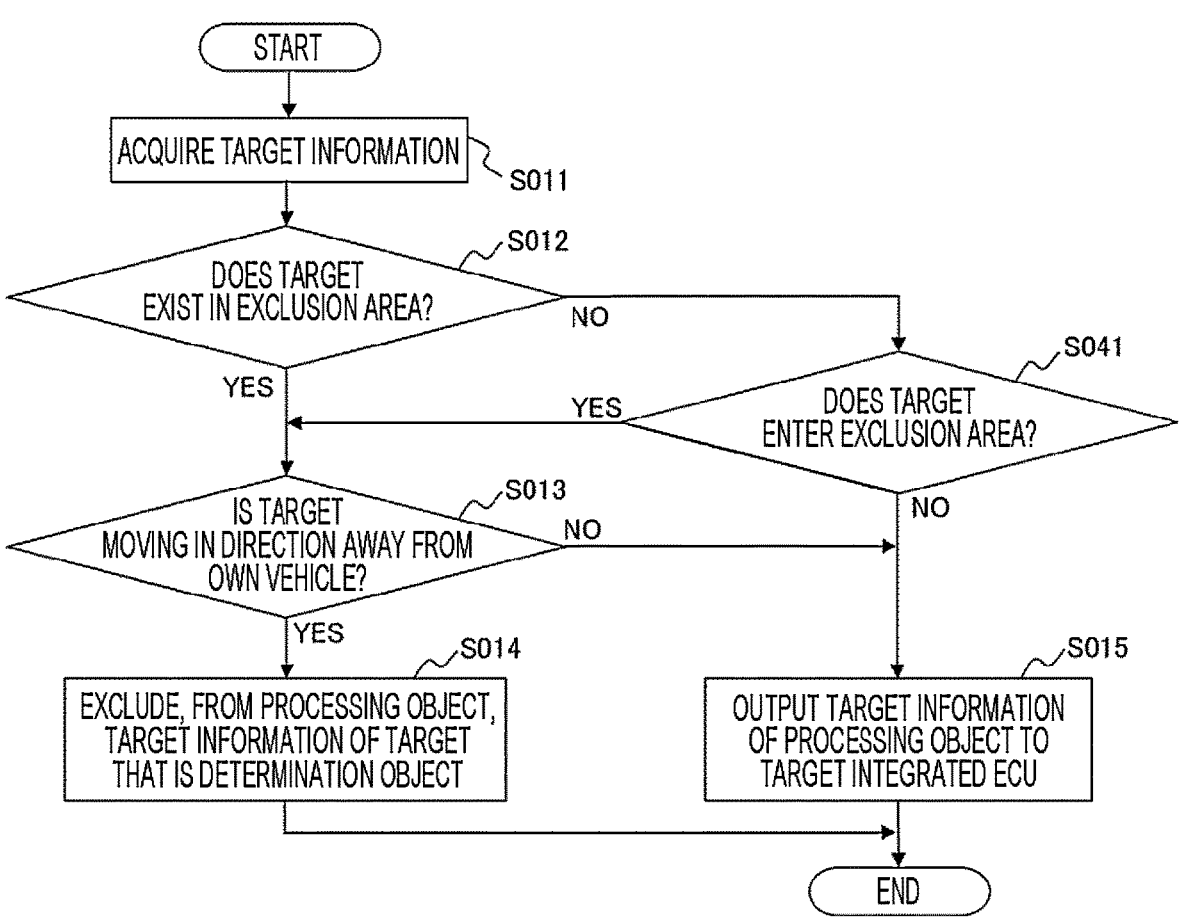
FIG. 15 is a flowchart showing an example of object determination processing executed by an exclusion object determination unit according to a fourth embodiment.

FIG. 15 is a flowchart showing an example of the object determination processing executed by the exclusion object determination unit 205 according to the fourth embodiment. The flowchart of FIG. 15 is different from the flowchart of FIG. 5B in that the processing of step S041 is added to the flowchart of FIG. 5B.

Hereinafter, the object determination processing executed by the exclusion object determination unit 205 according to the present fourth embodiment will be described. Note that processing different from that of the first embodiment will be described in detail, and description of processing similar to that of the first embodiment will be omitted.

As shown in FIG. 15, when it is determined in step S012 that the target exists in the exclusion area, the processing proceeds to step S013. When it is determined in step S012 that the target does not exist in the exclusion area, i.e., the target exists outside the exclusion area, the processing proceeds to step S041.

In step S041, based on the relative speed between the own vehicle 101 and a target existing outside the exclusion area, the exclusion object determination unit 205 determines whether or not the target enters the exclusion area, i.e., whether or not the target is moving in a direction toward the exclusion area. Note that the relative speed between the own vehicle 101 and the target is included in the target information of the target. For example, the exclusion object determination unit 205 determines whether or not the target enters the exclusion area by predicting the position of the target after a lapse of a predetermined time (e.g., several seconds) on an assumption that the target makes a uniform linear motion.

When the position of the target after the lapse of the predetermined time is within the exclusion area, the exclusion object determination unit 205 determines that the target enters the exclusion area. When the position of the target after the lapse of the predetermined time is not within the exclusion area, the exclusion object determination unit 205 determines that the target does not enter the exclusion area. Note that the determination method of whether or not the target enters the exclusion area is not limited to the above method.

When it is determined in step S041 that the target enters the exclusion area, the processing proceeds to step S013. When it is determined in step S041 that the target does not enter the exclusion area, the processing proceeds to step S015.

As described above, the exclusion object determination unit 205 determines whether or not the target existing outside the exclusion area is moving in a direction away from the own vehicle 101, the direction toward the exclusion area, by the processing of steps S041 and S013. Upon determining that the target existing outside the exclusion area is moving in a direction away from the own vehicle 101, the direction toward the exclusion area, the exclusion object determination unit 205 determines in step S014 to exclude, from the processing object, the target information of the target used for the determination. Upon determining that the target existing outside the exclusion area is not moving in a direction away from the own vehicle 101, the direction toward the exclusion area, the exclusion object determination unit 205 determines in step S015 not to exclude, from the processing object, the target information of the target used for the determination.

According to the present fourth embodiment, the target A012 illustrated in FIG. 7 is excluded from the processing object. Therefore, in the present fourth embodiment, among the targets A001 to A013 illustrated in FIG. 7, integration and tracking processing of the target information of the targets A003, A009, and A010 detected by the front camera 102, the target information of the targets A001, A002, A003, A008, A009, and A010 detected by the peripheral vision cameras 107 to 110, the target information of the targets A001, A002, A003, A008, A009, and A010 detected by the medium range radars 103 to 106, the target information of the target A009 detected by the long range radar 113, and the target information of the targets A003, A008, A009, and A010 detected by the laser radars 111 and 112 are performed.

In the first embodiment, the target information of 22 targets is the processing object of the target integration processing. However, in the present fourth embodiment, the target information of 20 targets is the processing object of the target integration processing, and the number of processing objects is further limited.

As described above, in the present fourth embodiment, based on the relative speed between the own vehicle 101 and the target outside the exclusion area, the control device 20 determines whether or not the target existing outside the exclusion area is moving in a direction away from the own vehicle 101, the direction toward the exclusion area.

Upon determining that the target existing outside the exclusion area is moving in a direction away from the own vehicle 101, the direction toward the exclusion area, the control device 20 determines to exclude, from the processing object, the target information of the target used for the determination (No in S012, Yes in S041, Yes in S013, and S014 in FIG. 15).

Upon determining that the target existing outside the exclusion area is not moving in a direction away from the own vehicle 101, the direction toward the exclusion area, the control device 20 determines not to exclude, from the processing object, the target information of the target used for the determination (No in S012, No in S041, and S015 in FIG. 15, or No in S012, Yes in S041, No in S013, and S015 in FIG. 15).

This configuration can reduce more the processing load of the electronic control device 200 by excluding, from the processing object, the target information of a target having a low possibility of coming into contact with the own vehicle 101 among the targets existing outside the exclusion area.

Fifth Embodiment

The electronic control device 200 according to the fifth embodiment of the present invention will be described with reference to FIGS. 16 and 17. Note that the identical or corresponding configurations as those described in the first embodiment will be given the identical reference numerals, and differences will be mainly described. Since the configuration of the vehicle 101 mounted with the electronic control device 200 according to the fifth embodiment is similar to that of the first embodiment, the description thereof will be omitted.

In the first embodiment, an example in which the exclusion area is set when the own vehicle 101 is stopped before an intersection has been described. On the other hand, in the present fifth embodiment, an example in which the exclusion area is set when the own vehicle 101 is stopped waiting for right turn will be described.

Figure 16:
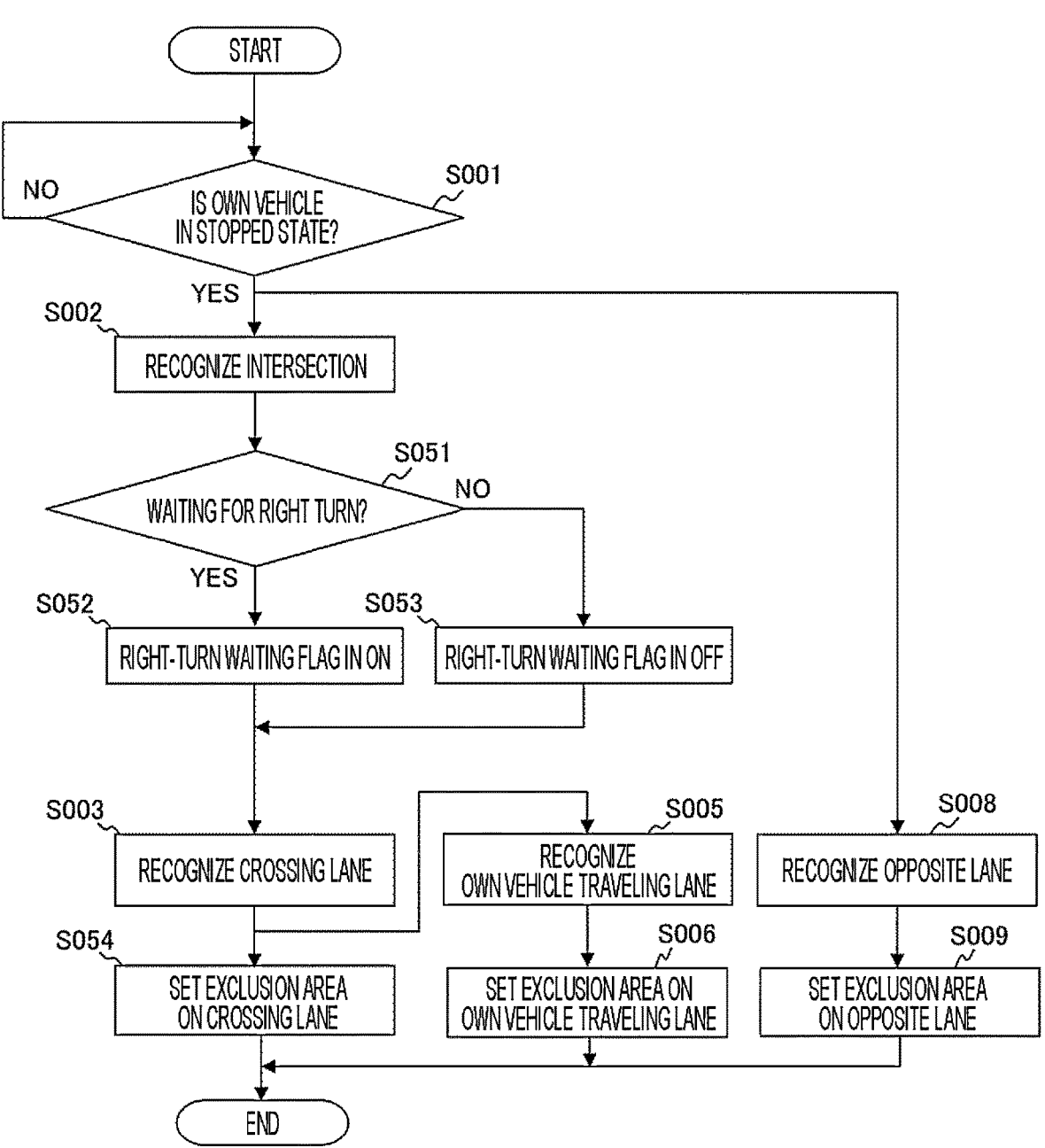
FIG. 16 is a flowchart showing an example of exclusion area setting processing executed by the exclusion area setting unit according to a fifth embodiment.
Figure 17:
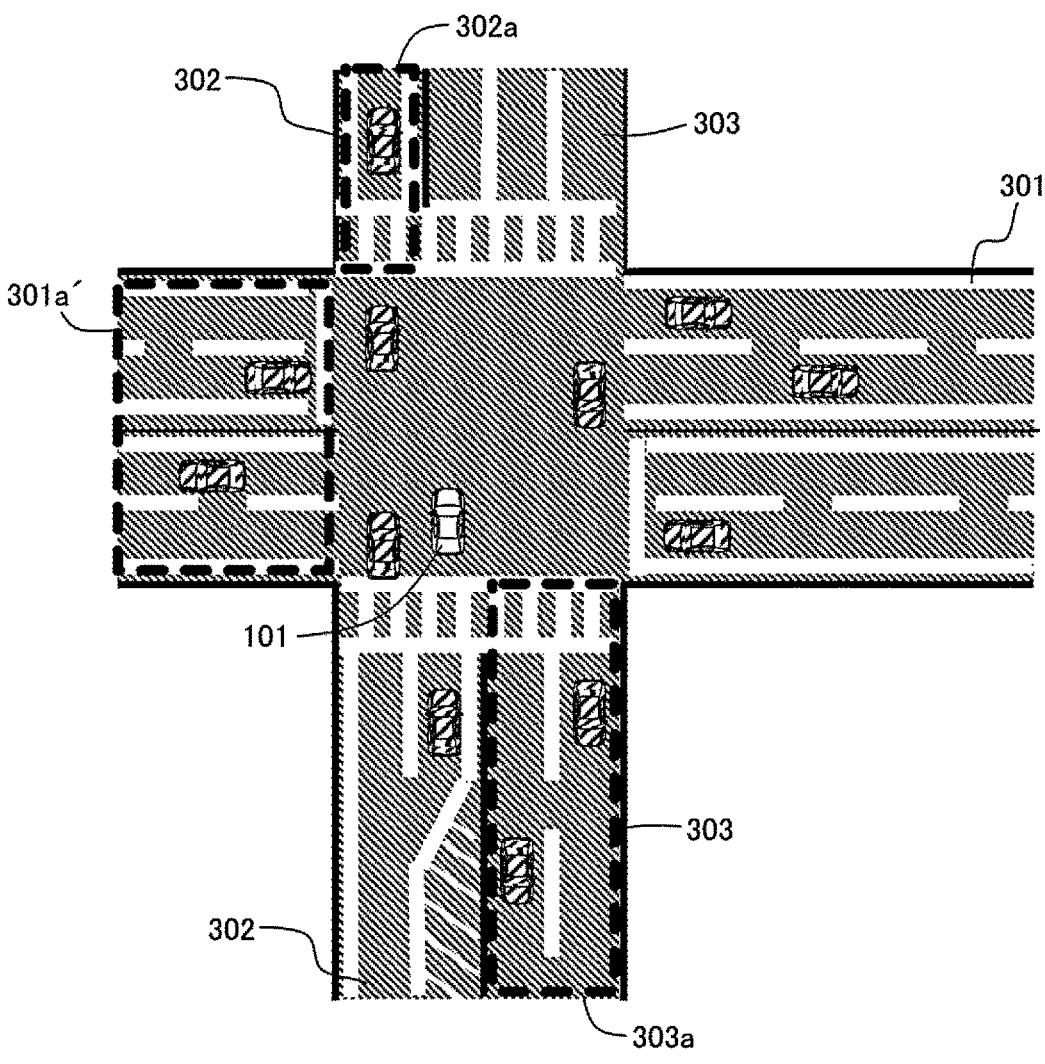
FIG. 17 is a view illustrating the own vehicle stopped waiting for right turn at an intersection of two lanes on each side and a plurality of targets (other vehicles) existing in a target detection range.

FIG. 16 is a flowchart showing an example of the exclusion area setting processing executed by the exclusion area setting unit 204 according to the fifth embodiment. The flowchart of FIG. 16 is different from the flowchart of FIG. 5A in that the processing of steps S051, S052, and S053 is added between step S002 and step S003 of the flowchart of FIG. 5A. In the flowchart of FIG. 16, the processing of step S054 is executed in place of the processing of step S004 of the flowchart of FIG. 5A. FIG. 17 is a view illustrating the own vehicle stopped waiting for right turn at an intersection of two lanes on each side and a plurality of targets (other vehicles) existing in a target detection range.

Hereinafter, the object determination processing executed by the exclusion object determination unit 205 according to the present fifth embodiment will be described. Note that processing different from that of the first embodiment will be described in detail, and description of processing similar to that of the first embodiment will be omitted.

As illustrated in FIG. 16, the intersection recognition processing is performed in step S002. Note that in the first embodiment, as the intersection recognition processing, processing of storing, into the storage device, the position of the intersection with respect to the own vehicle 101 is executed when the intersection exists ahead of the own vehicle 101.

On the other hand, the exclusion area setting unit 204 according to the present fifth embodiment determines whether or not the own vehicle 101 is positioned in the intersection from the positional relationship between the own vehicle 101 and the intersection in addition to the processing in the present first embodiment. Upon determining that the own vehicle 101 is positioned in the intersection, the exclusion area setting unit 204 stores, into the storage device, the position of the intersection with respect to the own vehicle 101. When the intersection recognition processing ends in step S002, the processing proceeds to step S051.

In step S051, the exclusion area setting unit 204 determines whether or not the own vehicle 101 is in a state of waiting for right turn based on the road environment information S1B, S2B, and S3B from the target detection device 208 or the map/position information 207A from the own vehicle position detection device 207.

The exclusion area setting unit 204 determines that the own vehicle 101 is in the state of waiting for right turn when the own vehicle 101 is positioned on a right turn lane or an extension of the right turn lane at the intersection, and determines that the own vehicle 101 is not in the state of waiting for right turn when the own vehicle 101 is not positioned on the right turn lane or the extension of the right turn lane at the intersection. When it is determined in step S051 that the own vehicle 101 is in a state of waiting for right turn, the processing proceeds to step S052. When it is determined in step S051 that the own vehicle 101 is not in a state of waiting for right turn, the processing proceeds to step S053.

Note that the determination method of whether or not the own vehicle 101 is in a state of waiting for right turn is not limited to this method. For example, it may be determined that the own vehicle 101 is in the state of waiting for right turn when the direction indicator (blinker) is operated to the right side, and it may be determined that the own vehicle 101 is not in the state of waiting for right turn when the direction indicator is not operated to the right.

In step S052, the exclusion area setting unit 204 sets a right-turn waiting flag to on, and the processing proceeds to step S003. In step S053, the exclusion area setting unit 204 sets the right-turn waiting flag to off, and the processing proceeds to step S003.

In step S003, the exclusion area setting unit 204 executes the crossing lane recognition processing, and the processing proceeds to steps S054 and S005. In step S054, the exclusion area setting unit 204 sets an exclusion area in the crossing lane 301. When the right-turn waiting flag is set to off, the exclusion area setting unit 204 sets the exclusion area 301a (see FIG. 8) in the crossing lane 301. When the right-turn waiting flag is set to on, the exclusion area setting unit 204 sets an exclusion area 301a' in the crossing lane 301 as illustrated in FIG. 17.

When the own vehicle 101 is waiting for a right turn, the possibility that the target existing in a region on the left side relative to the intersection in the crossing lane 301 comes into contact with the own vehicle 101 is lower than the possibility that the target existing in a region on the right side relative to the intersection in the crossing lane 301 comes into contact with the own vehicle 101. Therefore, the exclusion area setting unit 204 sets, as the exclusion area 301a', the entire region on the left relative to the intersection in the crossing lane 301.

As described above, in the present fifth embodiment, the control device 20 changes the setting method of the exclusion area between when the own vehicle 101 changes the traveling direction through the intersection (e.g., when turning right) and when the own vehicle 101 does not change the traveling direction through the intersection (i.e., when going straight).

In the present fifth embodiment, the control device 20 determines whether or not the own vehicle 101 intends to change the traveling direction through the intersection. Upon determining that the own vehicle 101 intends to change the traveling direction through the intersection, the control device 20 sets the exclusion area 301a' in a region opposite to the traveling direction in the crossing lane 301, and does not set an exclusion area in a region in the traveling direction in the crossing lane 301.

Upon determining that the own vehicle 101 does not intend to change the traveling direction through the intersection, the control device 20 sets the exclusion area 301a in the lane on the far side in the crossing lane, and does not set an exclusion area in the lane on the near side in the crossing lane 301.

This configuration can effectively reduce the processing load of the electronic control device 200 while preventing contact between the own vehicle 101 and the target in the case where the traveling direction is changed and in the case where the traveling direction is not changed.

The following modifications are also within the scope of the present invention, and it is also possible to combine the configuration illustrated in the modifications with the configurations described in the above-described embodiments, combine the configurations described in the above-described different embodiments, or combine the configurations described in the following different modifications.

<Modification 1>

In the first embodiment, an example in which the exclusion area 301a is set in the lane on the far side (far-side lane) from the own vehicle 101 in the crossing lane 301 has been described, but the present invention is not limited to this. The exclusion area setting unit 204 may set, as an exclusion area, a region on the left relative to the intersection in the lane on the near side (near-side lane) to the own vehicle 101 in the crossing lane 301.

For example, when the own vehicle 101 is in a state of waiting at a traffic light before the intersection and another vehicle waiting at a traffic light before the intersection exists between the intersection and the own vehicle 101, the exclusion area setting unit 204 according to Modification 1 sets, as the exclusion area, the entire region on the left relative to the intersection in the crossing lane 301.

When the own vehicle 101 is in a state of waiting at a traffic light before the intersection and another vehicle waiting at a traffic light before the intersection does not exist between the intersection and the own vehicle 101, the exclusion area setting unit 204 sets, as the exclusion area 301a (see FIG. 8), the entire lane on the far side (far-side lane) from the own vehicle 101 in the crossing lane 301 similarly to the first embodiment.

That is, the exclusion area setting unit 204 according to Modification 1 changes the shape and position of the exclusion area depending on whether the own vehicle 101 is positioned at the head or another vehicle exists between the own vehicle 101 and the intersection in a state where the own vehicle 101 is waiting at a traffic light before the intersection. As described above, by changing the shape and position of the exclusion area set in the crossing lane 301 in accordance with the positional relationship between the own vehicle 101 and the target existing in the own vehicle traveling lane 302, it is possible to more appropriately exclude, from the processing object, a target having a low possibility of coming into contact with the own vehicle 101 and reduce the processing load.

Note that when another vehicle waiting at a traffic light before the intersection exists between the intersection and the own vehicle 101, the exclusion area setting unit 204 may set the exclusion area so that the entire crossing lane 301 in the target detection range is included.

<Modification 2>

In the first embodiment, an example in which the exclusion area 303a is set in a region behind the own vehicle 101 in the opposite lane 303 when the own vehicle 101 is in a stopped state has been described, but the present invention is not limited to this.

<Modification 2-1>

For example, the exclusion area setting unit 204 may set the exclusion area in a region ahead of the intersection (on the far side of the intersection) in the opposite lane 303. For example, when the own vehicle 101 is in a state of waiting at a traffic light before the intersection and another vehicle waiting at a traffic light before the intersection exists between the intersection and the own vehicle 101, the exclusion area setting unit 204 sets the exclusion area so that the entire region (the own vehicle traveling lane 302 and the opposite lane 303) ahead of the intersection on the road on which the own vehicle 101 travels is included.

When the own vehicle 101 is in a state of waiting at a traffic light before the intersection and another vehicle waiting at a traffic light before the intersection does not exist between the intersection and the own vehicle 101, the exclusion area setting unit 204 sets the exclusion area 302a (see FIG. 8) in a region ahead of the intersection in the own vehicle traveling lane 302 similarly to the first embodiment.

That is, the exclusion area setting unit 204 according to Modification 2-1 changes the shape and position of the exclusion area depending on whether the own vehicle 101 is positioned at the head or another vehicle exists between the own vehicle 101 and the intersection in a case where the own vehicle 101 is waiting at a traffic light before the intersection. As described above, by changing the shape and position of the exclusion area set on the road on which the own vehicle 101 travels in accordance with the positional relationship between the own vehicle 101 and the target existing in the own vehicle traveling lane 302, it is possible to more appropriately exclude, from the processing object, a target having a low possibility of coming into contact with the own vehicle 101 and reduce the processing load.

<Modification 2-2>

The exclusion area setting unit 204 may set an exclusion area in a region behind the own vehicle 101 in the opposite lane 303 when the own vehicle 101 is in a traveling state. It is possible to reduce the processing load of the electronic control device 200 by excluding, from the processing object, the target information of another vehicle having passed by the side of the own vehicle 101 and moved to the rear of the own vehicle 101 when the own vehicle 101 is traveling on a road of one lane on each side, for example.

<Modification 3>

In the above embodiments, an example in which the exclusion area has a rectangular shape in plan view has been described, but the present invention is not limited to this. The shape of the exclusion area may be a trapezoidal shape in plan view. The shape of the exclusion area can be any shape such as a polygonal shape such as a triangular shape or a pentagonal shape, a circular shape, or an elliptical shape.

<Modification 4>

In the above embodiments, an example in which the exclusion area is set in the own vehicle traveling lane, the opposite lane, the crossing lane, the walkway, and the crosswalk has been described, but the present invention is not limited to this. The control device 20 may set the exclusion area in a pedestrian bridge and exclude a target such as a pedestrian walking on the pedestrian bridge from the object of the target integration processing.

<Modification 5>

In the above embodiments, an example in which the control device 20 excludes the object of the processing of integrating the target information has been described, but the present invention is not limited to this. For example, when the target information is subjected to point cloud processing, the control device 20 may determine whether to set the target information as a processing object or exclude the target information from the processing object based on the exclusion area and the target information. This can reduce the processing load of the point cloud processing.

While the embodiments of the present invention have been described above, the above embodiments merely illustrate some of the application examples of the present invention, and the technical scope of the present invention is not intended to be limited to the specific configurations of the above embodiments. Note that the control lines and information lines illustrated in the drawings indicate what is considered to be necessary for the description, and do not necessarily indicate all the control lines and information lines necessary for the product. In practice, it may be considered that almost all the configurations are connected to one another.

REFERENCE SIGNS LIST

20 control device
101 vehicle (own vehicle)
102 front camera (external sensor)
103 to 106 medium range radar (external sensor)

107 to 110 peripheral vision camera (external sensor)
111, 112 laser radar (external sensor)
113 long range radar (external sensor)
200 electronic control device
202 sensor ECU
203 target integrated ECU
203A integrated target information
204 exclusion area setting unit
204A exclusion area information
205 exclusion object determination unit
206 own vehicle behavior detection device
206A own vehicle behavior information
207 own vehicle position detection device
207A map/position information
208 target detection device
301 crossing lane
301a exclusion area
302 own vehicle traveling lane
302a exclusion area
303 opposite lane
303a exclusion area
310 road
311 median strip
312 own vehicle traveling lane
313 opposite lane
313a exclusion area
321 near-side crosswalk (crosswalk)
321a exclusion area
322 far-side crosswalk (crosswalk)
322a exclusion area
323 left-side crosswalk (crosswalk)
323a exclusion area
324 right-side crosswalk (crosswalk)
325 walkway
325a exclusion area

The invention claimed is:

1. An electronic control device comprising one or more memory devices storing target information of a target detected by a plurality of external sensors installed in an own vehicle and having a program stored therein that, when executed by one or more processors, causes the one or more processors to:

acquire information on an environment of a road on which the own vehicle travels and a position of the own vehicle, determine whether or not a median strip exists on the road on which the own vehicle travels, upon determining that the median strip exists on the road on which the own vehicle travels, set, among surrounding regions of the own vehicle, an exclusion area from a front to a rear of the own vehicle in an opposite lane, the exclusion area being a region for determining the target information to be excluded from a processing object from among the target information based on the environment of the road on which the own vehicle travels and the position of the own vehicle, determine whether to set the target information as the processing object or exclude the target information from the processing object based on the exclusion area and the target information, and control, based on a determination of whether to set the target information as the processing object or exclude the target information from the processing object, a vehicle operation of the own vehicle.

2. The electronic control device according to claim 1, wherein the one or more processors are further configured to;

acquire information on a speed of the own vehicle, and set the exclusion area based on the environment of the road on which the own vehicle travels and the position and speed of the own vehicle.

3. The electronic control device according to claim 1, wherein the one or more processors are further configured to determine whether to set the target information of the target as the processing object or exclude the target information from the processing object based on a relative speed between the own vehicle and the target existing in the exclusion area.

4. The electronic control device according to claim 1, wherein the one or more processors are further configured to perform processing of integrating the target information of the processing object detected by the plurality of external sensors and stored in the one or more memory devices.

5. The electronic control device according to claim 3, wherein the one or more processors are further configured to:

determine whether or not the target existing in the exclusion area is moving in a direction away from the own vehicle based on the relative speed between the own vehicle and the target existing in the exclusion area, upon determining that the target existing in the exclusion area is moving in the direction away from the own vehicle, determine to exclude the target information of the target used for the determination from the processing object, and upon determining that the target existing in the exclusion area is not moving in the direction away from the own vehicle, determine not to exclude the target information of the target used for the determination from the processing object.

6. The electronic control device according to claim 2, wherein the one or more processors are further configured to:

determine whether or not the own vehicle is stopped before a crossing lane, and upon determining that the own vehicle is stopped before the crossing lane, set the exclusion area on the crossing lane.

7. The electronic control device according to claim 2, wherein the one or more processors are further configured to:

determine whether or not the own vehicle is stopped on a road on which the opposite lane exists, and upon determining that the own vehicle is stopped on the road on which the opposite lane exists, set the exclusion area behind the own vehicle in the opposite lane.

8. The electronic control device according to claim 2, wherein the one or more processors are further configured to:

determine whether or not the own vehicle is stopped before a crosswalk, and upon determining that the own vehicle is stopped before the crosswalk, set the exclusion area on a crosswalk recognized other than the crosswalk.

9. The electronic control device according to claim 2, wherein the one or more processors are further configured to:

determine whether or not the own vehicle is stopped on a road on which a walkway exists, and upon determining that the own vehicle is stopped on the road on which the walkway exists, set the exclusion area in a rear of the own vehicle on the walkway.

10. The electronic control device according to claim 3, wherein the one or more processors are further configured to:

determine whether or not the target existing outside the exclusion area is moving in a direction away from the own vehicle, the direction toward the exclusion area, based on a relative speed between the own vehicle and the target existing outside the exclusion area, upon determining that the target existing outside the exclusion area is moving in the direction away from the own vehicle, the direction toward the exclusion area, determine to exclude the target information of the target used for the determination from the processing object, and upon determining that the target existing outside the exclusion area is not moving in the direction away from the own vehicle, the direction toward the exclusion area, determine not to exclude the target information of the target used for the determination from the processing object.

11. The electronic control device according to claim 1, wherein the one or more processors are further configured to change a setting method of the exclusion area between a case where the own vehicle changes a traveling direction through an intersection and a case where the own vehicle does not change the traveling direction through the intersection.

* * * * *